United States Patent [19]

Iwamura et al.

[11] 3,716,655

[45] Feb. 13, 1973

[54] RECORDING AND REPRODUCING SYSTEM OF A COLOR TELEVISION SIGNAL BY USING MONOCHROMIC RECORDING FILM

[75] Inventors: Soichi Iwamura, Fuchu City, Tokyo; Hotaka Minaguchi, Koza-gun, Kanagawa Pref.; Keisuke Murasaki, Shinjuku-ku, Tokyo, all of Japan

[73] Assignee: Nippon Hoso Kyokai, Tokyo, Japan

[22] Filed: May 21, 1970

[21] Appl. No.: 39,313

[30] Foreign Application Priority Data

May 22, 1969 Japan ..............................44/39446

[52] U.S. Cl.......178/5.4 CD, 178/6.7 A, 178/DIG. 28

[51] Int. Cl..............................H04n 5/86, H04n 9/34

[58] Field of Search ..178/7.2 D, 6.7 A, 7.88, DIG. 2, 178/5.2, 5.4, 5.4 CR

[56] References Cited

UNITED STATES PATENTS

| | | | |
|---|---|---|---|
| 3,475,549 | 10/1969 | Goldmark et al. | 178/5.2 |
| 3,378,635 | 4/1968 | Goldmark et al. | 178/7.2 D |
| 3,328,518 | 6/1967 | Valensi | 178/7.88 |
| 3,467,774 | 9/1969 | Bryant | 178/DIG. 2 |

*Primary Examiner*—Howard W. Britton
*Attorney*—Stevens, Davis, Miller & Mosher

[57] ABSTRACT

A recording and reproducing system of a color television signal by using monochromic photographic film, wherein one field of the color television signal is recorded sequentially in the plane of a frame of the photographic film by two-dimensional scanning, and the burst signal is recorded as a stripe like pattern on the film in the position out of the recorded frame. During the reproduction, said frame portion and the stripe pattern portion are scanned by a same scanning light and the light outputs are converted into electric signals by applying photoelectric conversion. By this means, a color television signal having correct hue may be obtained, since the reproduced color video signal and the burst signal have no relative phase deviation owing to a fact that their phases variate simultaneously. The scanning light for the recording and reproducing may be obtained from a cathode ray tube device, wherein burst photo spots are inserted at the end portions of the scanning line on the display surface of the cathode ray tube and by detecting direction and amount of deviation of the scanning line and applying feed back to the scanning deflection, it is possible to maintain the position of the scanning line and the luminance of the scanning spot toe constant.

12 Claims, 20 Drawing Figures

RECORDING AND REPRODUCING SYSTEM OF A COLOR TELEVISION SIGNAL BY USING MONOCHROMIC RECORDING FILM

BACKGROUND OF THE INVENTION

1. Field of the Invention

The present invention relates to an improvement of a recording and reproducing system of a color television signal on a monochromic photo-film, and more particularly, to such a system and a device wherein the color burst signal representing phase reference information of the sub-carrier of the color television signal is recorded at a discrete portion on the film different from the portion recording the picture information and at the reproduction of the signal said portions recording the picture information and the burst signal are scanned simultaneously by using the same scanning light.

2. Description of the Prior Art

There have been disclosed various systems for recording a color television signal on a monochromic photo-film. In a known system, the chrominance information is modulated on a carrier with the side bands and superposed on the luminance signal and recorded on photo-film in such a manner that each of the sequential field signals is recorded on each one of the sequential frames, while the carrier is suppressed and not recorded.

The reason for suppressing the carrier is that the SN ratio is improved by the suppression of the carrier as compared with a system not suppressing it, and that if the carrier is not suppressed there is danger of producing false color information, even in the period of no color information by the record of the carrier, but such danger may not exist by suppressing the carrier.

As mentioned above, since the carrier is not recorded on the recording media, the carrier wave should be formed at the time of reproduction of the signal in order to demodulate color information from the side band waves.

However, in the reproduction of a color television signal recorded on such monochromic photographic material, a color information having correct phase may not be obtained by merely demodulating the obtained modulated side waves after photoelectric conversion by using a carrier having correct phase and frequency. This is due to non-linear distortion of the scanning light at the time of recording and reproducing and other causes. Accordingly, it is desired to record the carrier which is identical with the carrier used for modulation of the color information on the monochromic photographic film and to utilize it for demodulation of the color information at the time of the reproduction.

In the known system, the color information is modulated by a carrier having a frequency which is an integer multiple of the horizontal scanning frequency of the television signal and is superposed on luminance information by carrier suppression, and at the same time the luminance signal is treated to eliminate the frequency components corresponding to said carrier frequency and a reference carrier wave is superposed onto the thus eliminated band and recorded on a monochromic photographic film. With reproduction, the reference carrier wave is derived from the reproduced luminance signal. The signal is doubled in frequency and by using this double frequency the color information is obtained by demodulating the modulated side bands containing the color information.

Such known system has an advantage in that the reference carrier wave may easily be obtained at the time of reproduction even if the retracing is not effected completely and the reproduction of the color image information is possible by the reference carrier wave due to the fact that the reference carrier wave recorded on sequential lines forming a field of the picture on a film are all in phase and are recorded as dark and light stripe patterns on the film frame since the frequency of the reference carrier wave is selected to be an integer multiple of the horizontal scanning frequency. However, a deterioration of the reproduced picture is unavoidable in such known system owing to the fact that a part of the frequency components in the luminance signal, especially the comparatively low frequency components, has been eliminated. Also, such known system has another disadvantage in that line shaped images may appear in the reproduced picture from the recorded film owing to the fact that the component of the reference carrier wave may mix into the luminance signal.

It is difficult to completely eliminate this phenomena of production of stripe shaped pattern even by a method of recording the reference carrier wave in a low level or by a method of recording it on the film to be of opposite phase in each of the sequentially recorded pictures so as to cancel the phenomena by using after image characteristics of the eye.

SUMMARY OF THE INVENTION

The present invention has for its object to realize a recording and reproducing system by using a monochromic film which is able to eliminate such disadvantages.

The second object of the present invention is to realize a reproducing device from a monochromic photographic film recorded according to the system of the present invention which is able to demodulate color information having correct phase despite occurrence of lateral vibrations of the running film and non-linearity of scanning deflection of the scanning light spot which might tend to cause variation of mutual phase relationship between the reference carrier and the video signal.

The third object of the present invention is to obtain a controlling device for the position and length of the scanning line in recording a color television signal on a monochromic photographic film by means of a cathode ray tube to maintain the position and length of the displayed scanning line automatically thus to record the signal onto correct position of the film.

In order to realize the above objects in the system of the invention, the color video signal, in which the carrier chrominance signal is superposed on the luminance signal by frequency interleaving, and the reference carrier required for the demodulation of chrominance components are recorded on separate locations of the monochromic photo-film.

In accordance with the system of the present invention the color video signal is recorded on each frame of the film just like the conventional manner, and the reference carrier is recorded onto the film in a location outside the recording position of the color video signal, for instance, onto a frame prior to the recording of the color video signal or onto a portion between each two successive frames recording the video signal, which is corresponding to the vertical blanking period. In accordance with the system of the invention no portion of the frequency component of the color video signal is eliminated from the video signal to be recorded, contrary to the conventional system as explained above.

The color video signal and the reference carrier wave recorded onto the film are scanned at the time of reproduction by means of the same scanning light and applied with photoelectric conversion.

The reproduced reference carrier obtained in this manner may include the same distortion has that of the reproduced color video signal in the reproducing device; therefore, the phase relationship between the two signals is maintained to be constant. Thus a color signal having correct color information in correct color phase can be demodulated.

In the case where the reference carrier is recorded in a portion between two successive frames in the film, and the film is scanned by a flying spot scanning to reproduce the signal, while running the film, the reference carrier is reproduced as a burst signal existing only during the vertical blanking period of the reproduced color video signal. In this case the reproduced burst signal must be memorized during the successive one field period and a locked oscillator is driven by the memorized signal so as to obtain the reference carrier for the reproduction of the color signal having identical phase with that of the burst signal.

When recording the color video signal onto the film surface a scanning light displayed on a cathode ray tube may be used in which case the position and the length of the scanning light should be maintained always to be constant. In the system of the present invention the luminance of both extreme ends of the scanning line of the scanning light is modulated by using a reference signal having sinusoidal burst shape. The photo images of the reference signal at the both ends of the scanning line may deviate in position or in phase according to the variation of the position and length of the scanning line. This deviation is detected as a variation of luminance distribution and the center of the scanning line and deflection of the scanning spot of the cathode ray tube may be automatically controlled by using the sum and difference of modulated signals.

The details of the present invention will become clear by referring to the following description with respect to the practical embodiments substantially illustrated in the accompanying drawings.

DESCRIPTION OF THE PREFERRED EMBODIMENTS

Figure 1:
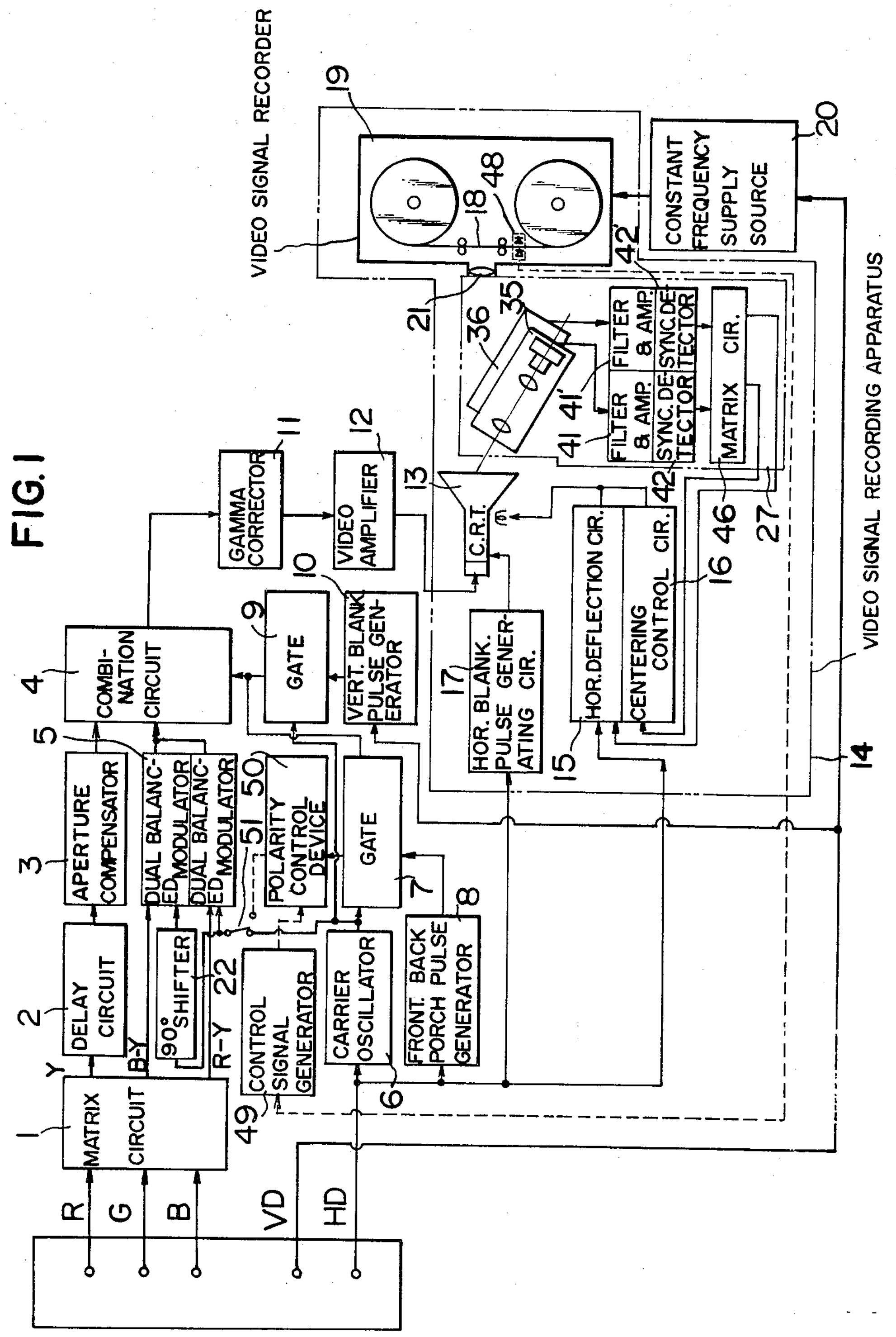
FIG. 1 is a block diagram showing the recording device according to the present invention.

In FIG. 1, R, G, B and VD, HD indicate three primary color signals and vertical and horizontal driving signals, respectively. The three primary color signals R, G and B are converted into a luminance signal Y and color difference signals B-Y and R-Y in matrix circuit 1. The luminance signal Y is supplied through a delay circuit 2 and an aperture compensator 3 to a combination circuit 4. The color difference signals B-Y and R-Y are supplied to a dual balanced modulator 5 as modulating signals and modulate two carriers in the quadrature phase. These carriers have a frequency of an integer multiple of line frequency, for example, 280 times the line frequency. One of the carriers is supplied from a carrier oscillator 6 through a 90° phase shifter 22 and the other is directly supplied from the carrier oscillator 6.

The modulated signal with suppressed carrier, i.e., the carrier chrominance signal C thus obtained, is supplied to the combination circuit 4 and combined with the luminance signal Y and then the combination circuit 4 produces a color video signal as an output. At the same time the carrier signal from the oscillator 6 is passed through a gate circuit 7 which conducts under the control of front-back porch pulses from a front-back porch pulse generating circuit 8 driven by the horizontal driving signal HD and the carrier waves thus gated are supplied to the combination circuit 4 and superposed therein on front and back porches of the horizontal flyback period immediately before and after the video signal of one line. The carrier signal from the oscillator 6 is also supplied to a gate circuit 9. The gate circuit 9 is controlled by a vertical blanking signal from a vertical blanking signal generating circuit 10 which is controlled by the vertical driving signal VD. Thus the output carrier of the oscillator 6 is supplied to the combination circuit 4 during the vertical blanking period so that the carrier signal is superposed on the vertical blanking period of the color video signal as a carrier reference signal for demodulation.

A video signal recording apparatus 14 consists of at least a cathode ray tube 13 having a phosphorous display screen; a horizontal deflection circuit 15 controlled by the horizontal driving signal HD of the color television signal to be recorded, and producing a sawtooth signal having a period related to that of said horizontal driving signal HD for deflecting said cathode ray tube 13 and receiving an information signal representing a line amplitude variation, to control the amplitude of said sawtooth wave signal; a centering control circuit 16 receiving an information signal representing a line center position to control the center of the horizontal line, means 27 for producing two information signals, the details of which will be explained hereinafter; and a horizontal blanking signal generating circuit 17 for generating a horizontal blanking signal related to said period to cut-off a return electron beam in the horizontal scanning so as to suppress the blanking of the bright spot. Said video signal recording apparatus 14 further comprises a video signal recorder 19 wherein an elongated record film 18 is moved at a constant speed related to the vertical synchronization of the color television signal and a television image of one field is recorded in one area or frame of said film by means of a uni-dimensional scanning light beam produced on the display screen of said cathode ray tube 13 so that the television signal is recorded in successive frames on the film apart from each other by a distance corresponding to the vertical blanking period. A film driving motor arranged in said video signal recorder 19 is fed by a constant frequency supply source 20 controlled by said vertical driving signal VD related to said color television signal.

The combined signal from the combination circuit 4 is supplied to a control electrode of the uni-dimensional scanning cathode ray tube 13 provided in the video signal recording apparatus through a gamma correction device 11 and a video amplifier 12 and a brightness of the flying spot displayed on the phosphorous screen of the cathode ray tube 13 is modulated.

The line scanning light beam thus modulated in its intensity is projected on the recording film 18 and the color video signal is so recorded on the film 18 that one field signal forms one frame and a two-dimensional scanning recorded surface is formed in relation to the traveling of the film 18. At the same time on a portion of two successive frames and on both sides of the frame of the film 18, the carrier signal is recorded as stripe patterns elongated in the direction of the traveling of the film 18.

Figure 2:
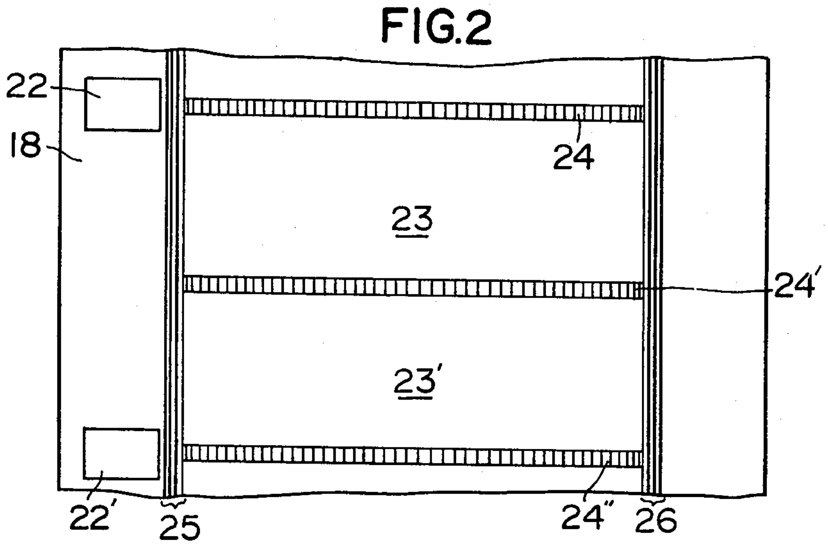
FIG. 2 is a schematic diagram showing a recorded pattern of color television signal on a monochromic film according to the present invention.

FIG. 2 shows the recorded pattern. In FIG. 2, the color video signals 23, 23′, . . . corresponding to two fields consisting of one frame of the television signal are recorded between two successive perforations 22, 22′, . . . of the conventional film 18 in two successive frames apart from each other by the distance corresponding to the vertical blanking period and the carrier signals used for producing the carrier chrominance signal are recorded on portions 24, 24′, 24″, . . . between the frames corresponding to the vertical blanking period and on both sides 25, 26 of the frame portion corresponding to the front and the back porches situated immediately before and after the color video signal of one line.

The video signal recording apparatus 14 which is one of the constructional elements of the recording device according to the invention, is a well-known apparatus merely in view of recording images. However, according to the invention this apparatus is further provided with an automatic control device for compensating particularly variations of length and position of the uni-dimensional scanning light beam of the cathode ray tube 13 and this construction is entirely novel.

That is to say, according to the invention in order to increase the definition at recording time and avoid color distortions in a reproduced color television signal at reproduction time, the carrier signal from the carrier oscillator 6 is supplied through the gate circuit 7 to the combination circuit 4 and is superposed on the position of the horizontal blanking period just before and after the color video signal of one line, so that the length and the position of the scanning light displayed on the phosphorous screen of the cathode ray tube 13 can be maintained constant.

This results in that at both ends of the scanning line displayed on the screen of the cathode ray tube, several light images of the reference signal modulated in its brightness by said carrier are recorded.

In the scanning line control device according to the invention, magnitude and direction of the length of the scanning line and magnitude and direction of the center of the scanning light are detected from the variation of position of said reference signal light images, and the detected signals are fed back to the deflection circuit 15 and the centering control circuit 16 so as to effect an automatic correction.

Figure 3:
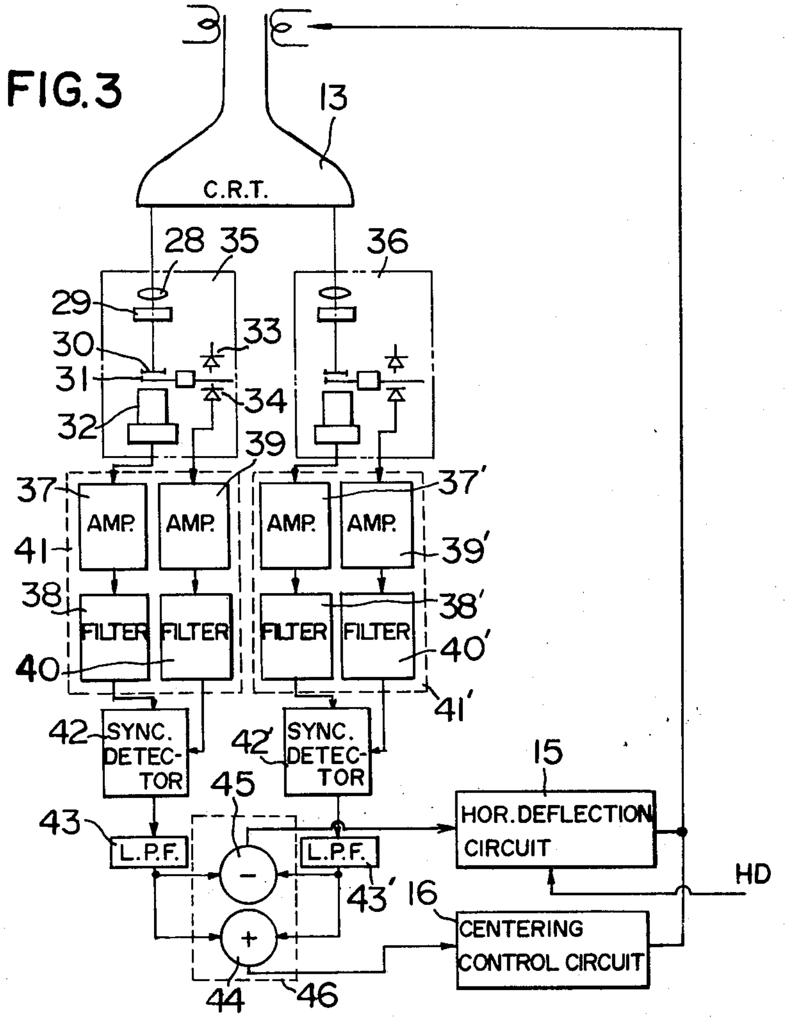
FIG. 3 shows more detailed circuit diagram for the scanning line controlling circuit of the uni-dimensional scanning light of the present invention.
Figure 4:
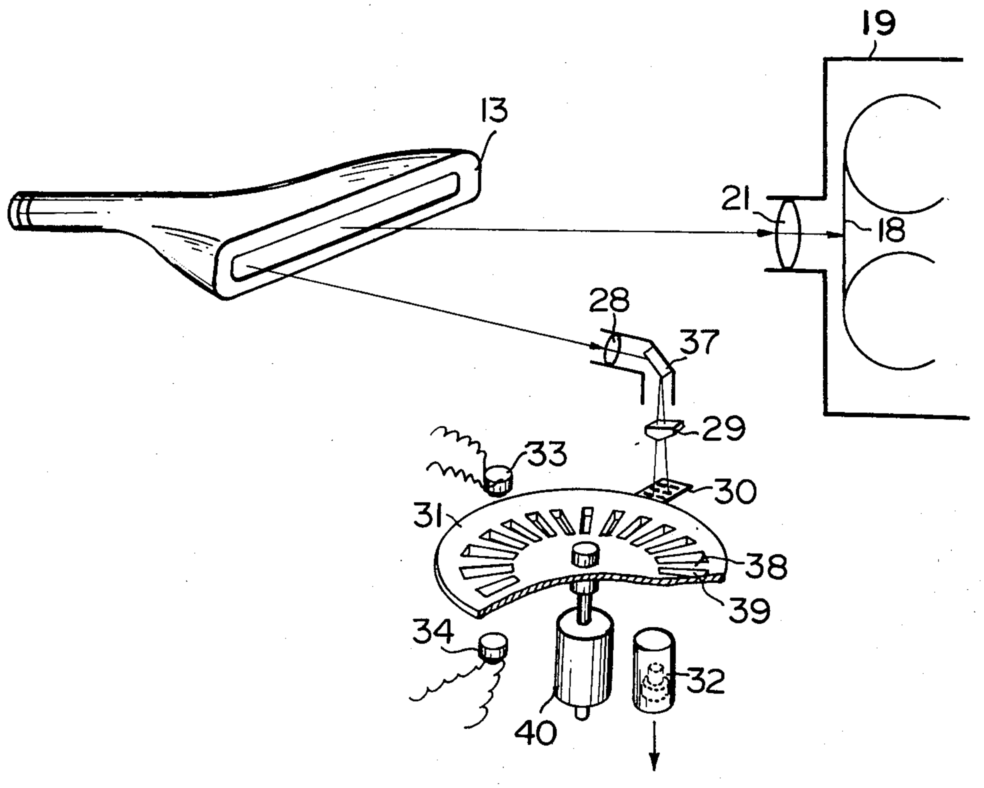
FIG. 4 is a simplified diagram showing a practical embodiment of the photoelectric converter of the reference signal shown in FIG. 3.

FIGS. 3 and 4 show a detailed construction of the scanning line control device. This device comprises an objective lens 28, a Dach prism (roof prism) 29, a slit plate 30 having two slit rows at upper and lower positions, a rotary shutter disc 31 and a photoelectric tube 32. The light images of the reference signal at both ends of the scanning line displayed on the phosphorous screen of the cathode ray tube 13 are passed through the objective lens 28 and then divided into two by the Dach prism 22 and these two images are focused on the upper and lower slit rows of the slit plate 30, respectively. Light rays passed through these slits are chopped by the rotary shutter disc 31 and are alternately incident upon the photoelectric tube 32. The scanning line control device further comprises a light emissive diode 33 and a photo diode 34. The light emanated from the diode 33 is chopped by the rotary shutter disc 31 and is incident upon the photo diode 34 so that a signal is produced having a frequency equal to the frequency (chopper frequency) of an alternating current signal produced from the photoelectric tube 32. There are provided two sets of photoelectric converters 35, 36 for converting the reference signal light images and two light images of the reference signal at both ends of the scanning line are separately converted photoelectrically into electric signals.

In practice, the objective lens 28 and a mirror 37 are used to bent the light from the reference signal light images downward so as to ensure that the rotary shutter disc, etc., do not interfere with the video signal recording system as shown in FIG. 4 (wherein the same parts as those shown in FIG. 3 are denoted by the same reference numerals). The rotary shutter disc 31 consists of shutter parts 38 of a width equal to a distance between two light images of the reference signal divided by the Dach prism 29 and passing through both of the upper and lower slit rows of the slit plate 29, respectively and of transparent parts 39 of the same width as that of the shutter parts 38. A number of these shutter parts and transparent parts are arranged along the periphery of the disc. The disc 31 is rotated by a motor 40 at a constant speed. The distance between the two slit rows of the slit plate 30 corresponds to the period of the brightness distribution of the reference signal light images in the relation shown in FIGS. 5A and 5B and the phases of two slit rows are mutually shifted by 180°. The slit plate 30 is so arranged that when the position and length of the scanning line on the phosphorous display screen of the cathode ray tube 13 are correct, the transmitted lights through the upper and lower slit row are equal to each other with respect to the brightness distribution of the reference signal light images, whereas when the reference signal light images at the ends of the scanning line are varied, the magnitudes of lights passing through the upper and the lower slit rows differ from each other in accordance with the variations. Therefore, when the transmitted lights through the upper and lower slit rows are chopped by the shutter disc 31 and are incident on the photoelectric tube 32 alternatively, the photoelectric tube 32 generates an alternating current signal of the chopper frequency in accordance with variations at ends of the scanning line. In a filter and amplifying circuit 41, the alternating current signal thus derived from the photoelectric converter of the reference signal light images and the output signal from the photo diode 34 are passed through a transmitting network consisting of an amplifier 37 and a band pass filter 38 and a transmitting network consisting of an amplifier 39 and a low pass filter 40, respectively. The output signal of the filter and amplifying circuit 41 is supplied to a synchronous detector 42. In the synchronous detector 42, the alternating current signal is synchronously detected with the output of the photo diode 34 as the reference. Such a system is provided for each reference signal light image at each end of the horizontal scanning line on the screen of the cathode ray tube as shown by 41′, 42′ in FIG. 1 and by 37′, 38′, 39′, 40′, etc. in FIG. 3.

Each detected signal from each of synchronous detectors 42, 42′ is supplied to a matrix circuit 46 consisting of an adder 44 and a subtractor 45 through low pass filters 43, 43′, respectively. Since both of the detected voltages obtained from each of the synchronous detectors 42, 42′ indicate the direction and magnitude of variations at left and right ends of the scanning line, a summed voltage indicates the direction and magnitude of a shift of the center of the scanning line and a subtracted voltage indicates the direction and magnitude of a variation of the amplitude. Therefore, the centering control circuit 16 is controlled by the output from the adder 44 and a deflection amplitude control circuit in the deflection circuit 15 is controlled by the output of the subtractor 45, so that both ends of the scanning line are always situated at their given positions.

Figure 5:
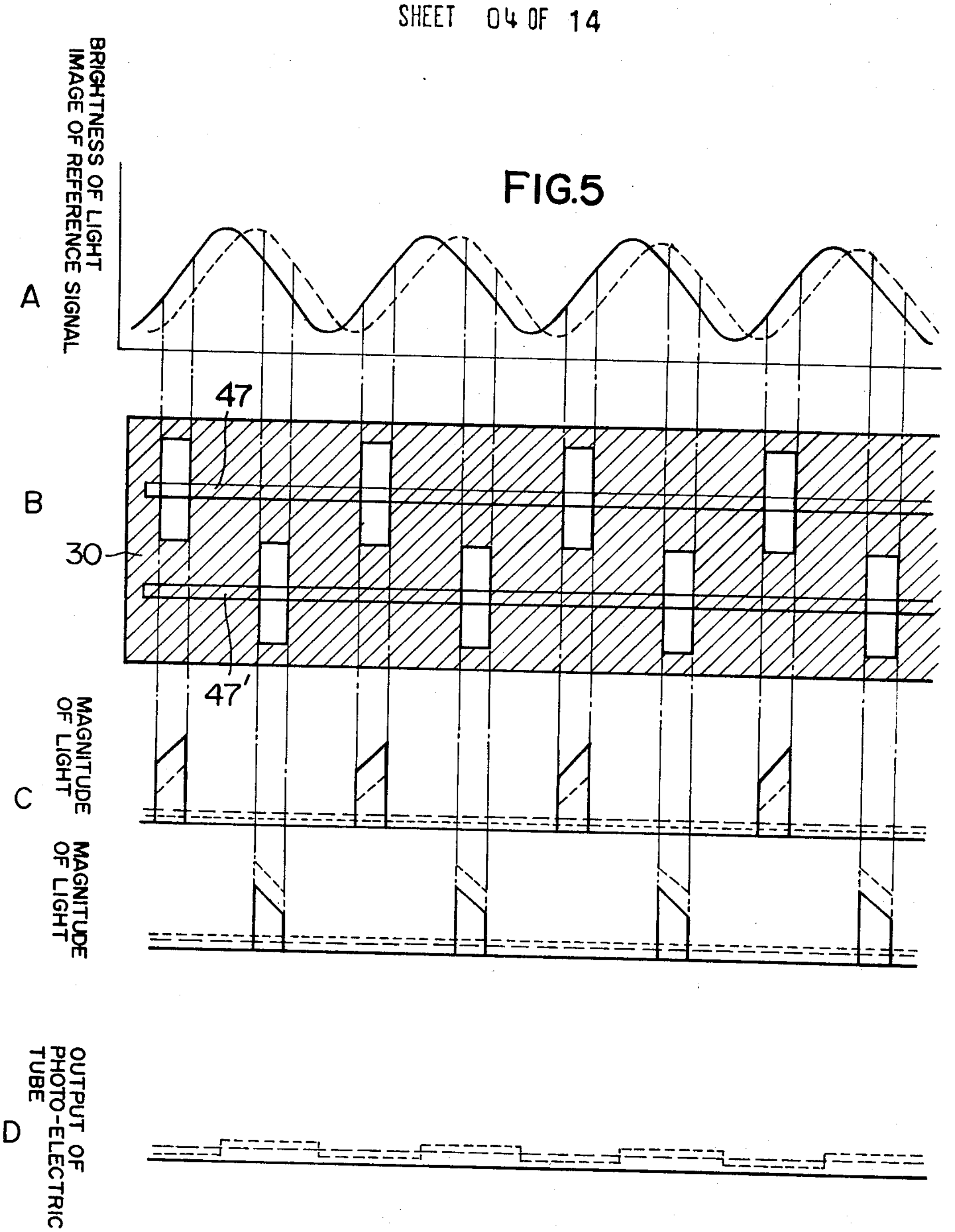
FIG. 5 shows wave forms explaining the operation of the device shown in FIG. 4.

The manner of producing the alternating current signal from the output of the photoelectric tube 32 in accordance with variations of the reference signal light image will now be explained in detail with reference to FIG. 5.

FIG. 5A shows brightness distribution characteristics of the reference signal light images displayed on the cathode ray tube 13 in an enlarged scale. A solid curve shows a characteristic when the reference signal light images are situated at the given positions and a dotted curve shows that when the light images of the reference signal are shifted to the right. Since the reference signal is a sinusoidal wave and has a frequency which is an integer multiple of the horizontal scanning line frequency, the brightness distribution of the images become also sinusoidal and their phases are identical for each scanning line. FIG. 5B shows the slit plate 30 shown in FIGS. 3 and 4 and 47, 47′ indicate the projected light images of the reference signal after divided by the Dach prism 29 into two images. The slit plate 30 is arranged in the position shown in FIG. 5B with respect to the brightness distribution of the reference signal light images in the given positions, so that the magnitudes of lights passing through the upper and lower slit rows are equal to each other as shown in FIG. 5C. Therefore, when the light images of the reference signal are in the given positions, average value of the transmitted lights through the upper and lower slit rows are equal to each other as shown by solid line in FIG. 5C and even if the transmitted lights through the upper and lower slit rows are chopped by the shutter disc 24 and are projected alternatively on the photoelectric tube 32, the output of the tube 32 is a constant d.c. voltage as shown by dash line in FIG. 5C. On the contrary when the light images of the reference signal are shifted, for example, to the right and thus the brightness distribution is shifted as shown by the dotted line in FIG. 5A, the transmitted light through the upper slit row is different from that through the lower slit row. In this case, an average value of the magnitude of transmitted lights through the upper slit row and that through the lower slit row, which have been equal to each other in the corrections of the light images (shown by dash line), become different from one another and result in an unbalanced condition shown by dotted line in FIG. 5C. A difference therebetween corresponds to magnitude of the shift of the light images of the reference signal and its polarity corresponds to the direction of the shift, so that when transmitted lights through the upper and lower slit rows are chopped by the shutter disc 31 and then are incident on the photoelectric tube 32 alternatively, besides the direct current component, an alternating current signal of the chopper frequency having a polarity and amplitude in accordance with a direction and magnitude of a variation of the reference signal light images is generated as shown by a dotted line in FIG. 5D. However, in practice the alternating current signal does not have the correct waveform as shown in FIG. 5D, so that after synchronous detection the alternating current signal is supplied to the adder 44 and the subtractor 45 after smoothing their waveforms is the low pass filters 43, 43' which pass only signals having frequencies much lower than the chopper frequency.

In an embodiment of the invention, the reference signal of sinusoidal burst form is of 4 cycles of a frequency 280 times higher than the horizontal scanning frequency. Therefore, the length of the light image of the reference signal is only 2.4 mm with respect to the length of the effective horizontal scanning line of 170 mm. The number of the slits provided in each of the upper and lower slit rows of the slit plate 30 is four corresponding to the number of cycles of the high images of the reference signal. If the number of shutter parts 38 of the rotary shutter disc 32 shown in FIG. 4 is, for instance, 32 and the rotation speed of the driving motor 40 is 1,500 r.p.m., then the chopper frquency becomes 800 Hz. The passing band of the low pass filter 43 is 150 – 200 Hz.

Figure 6:
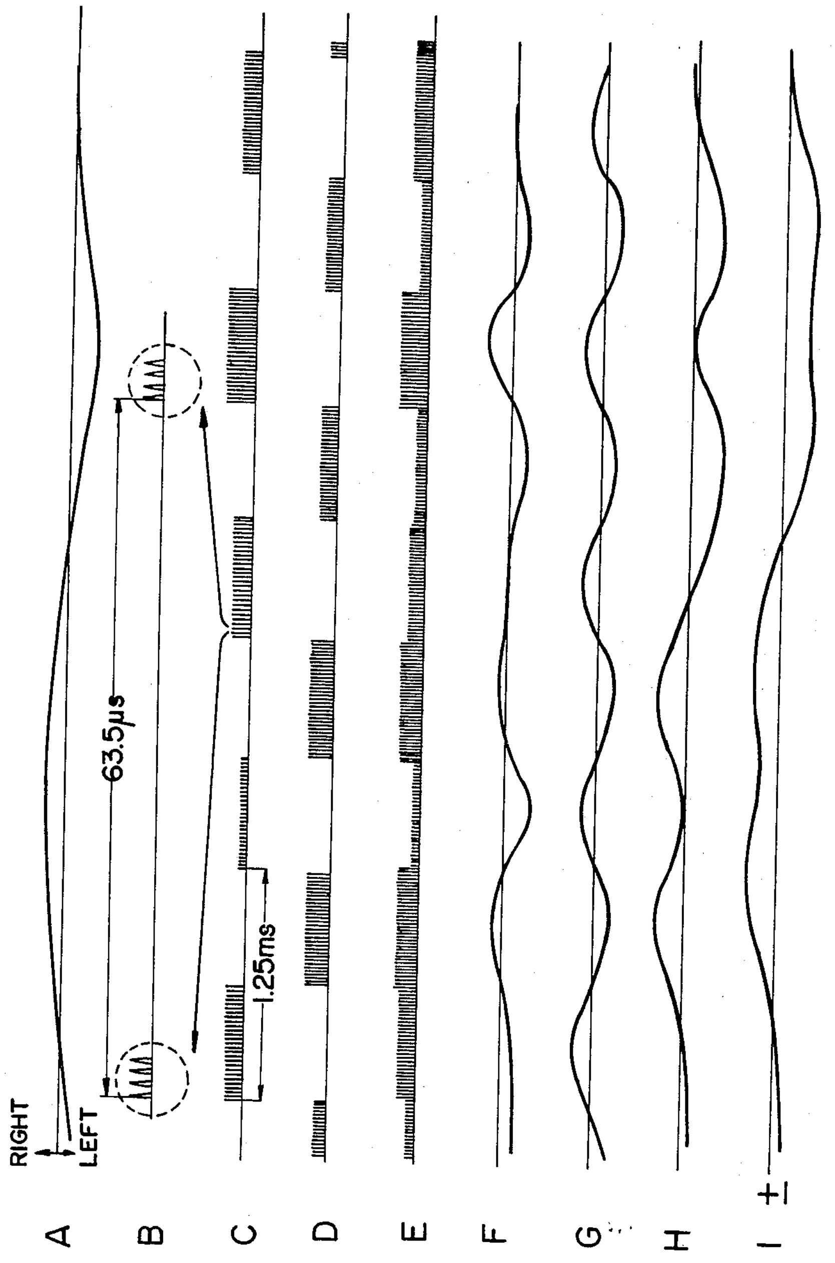
FIG. 6 is an explanatory diagram of the wave forms for the scanning line controlling circuit shown in FIG. 3.

In FIG. 6, there are shown what alternating current signal is generated and how to detect and smooth it, when the position of the scanning line is shifted as shown in FIG. 6A in the above embodiment. FIGS. 6C and 6D show the transmitted lights through the upper and the lower slit rows (after being chopped by the shutter disc 31), when the position of the scanning line is varied as shown in FIG. 6A. In FIGS. 6C and 6D, successive lines indicate lights from the light images produced by successive scannings. In practice, since the number of the slits of each of the upper and the lower slit rows is four, lights from the light images of the reference signal are shown in FIG. 6B in an enlarged scale. A mutual distance between two successive lines corresponds to the horizontal scanning period of 63.5 $\mu$s as shown in FIG. 6B. FIG. 6E shows incident lights onto the photoelectric tube 32 which is a sum of the transmitted lights through the upper and the lower slit rows shown in FIGS. 6C and 6D, respectively. Therefore, the alternating current signal shown in FIG. 6F is derived from the low pass filter 38 shown in FIG. 3. FIG. 6G shows a synchronously detected signal from the band pass filter 40. FIG. 6H shows a signal which is obtained by detecting the alternating current signal shown in FIG. 6F with the signal shown in FIG. 6G in the detector 42 shown in FIG. 3. FIG. 6I shows an output which is obtained by smoothing the detected signal shown in FIG. 6H in the filter 43. As can be seen from FIG. 6I, the smoothed output represents the direction and magnitude of the variations of the scanning line position.

It should be noted that the video signal recording apparatus according to the invention is not limited to the abovementioned embodiment and various modifications are possible within the scope of the invention. For example, although in the above embodiment the transmitted lights through the upper and lower slit rows are received by a single photoelectric tube after being chopped by the rotary shutter disc, the transmitted lights through the upper and the lower slit rows may be received by separate photoelectric tubes.

In FIG. 1, the blocks connected by the dotted line may be used to invert alternatively the phase of the carrier for producing the carrier chrominance signal by 180° line by line of the color video signal. That is, a detecting means consisting of a light emissive diode and a photo diode is arranged in the traveling path of the recording film 18 so as to detect the perforations on the recording film 18 and a control signal generator 49 is driven by the signal thus detected and a polarity control device 50 is operated with a timing related to the perforations, so that the phase of the carrier supplied from the carrier oscillator 6 to the dual balanced modulator 5 can alternatively be inverted. In this case a switch 51 should be switched to the side of the polarity control device.

The film having the record pattern shown in FIG. 2 recorded by the abovementioned recording apparatus according to the invention is used in a reproducing apparatus according to the invention which will be explained later to reproduce a color television signal for obtaining an extremely excellent color image.

Figure 7:
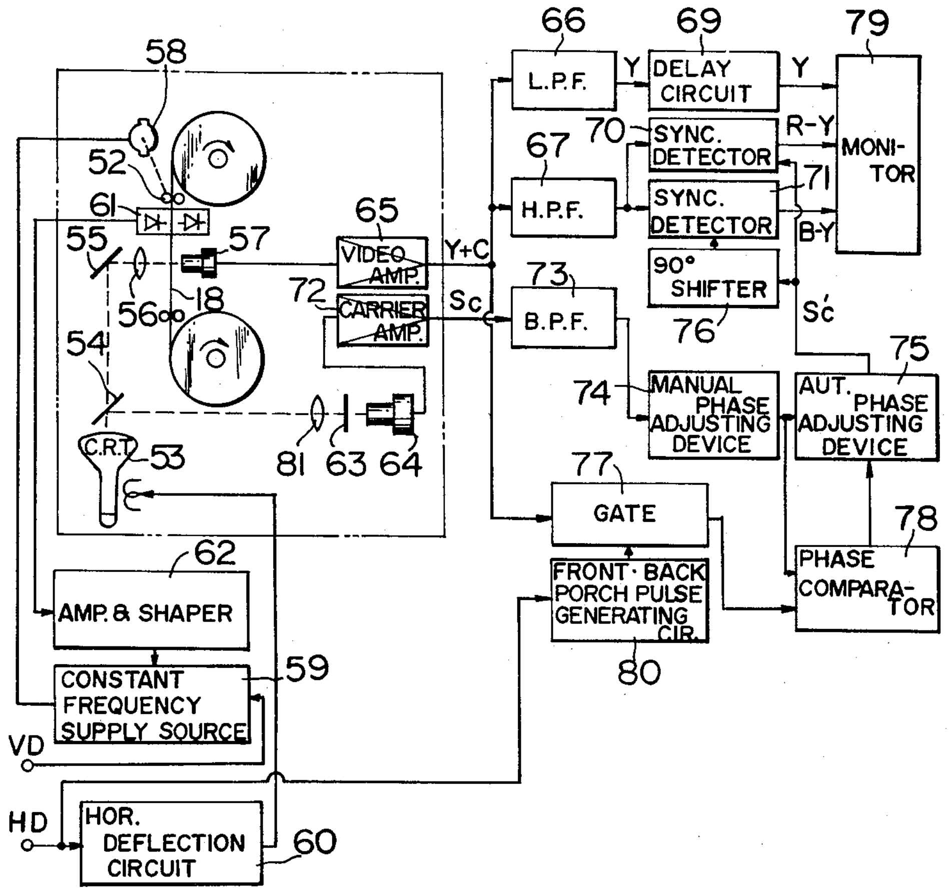
FIG. 7 shows a block diagram of the reproducing device according to the present invention.

FIG. 7 shows an embodiment of the reproducing apparatus according to the invention. The recorded film 18 is moved at a constant speed by means of a capstan 52. A flying spot produced by a FSS cathode ray tube 53 for a uni-dimensional scanning is divided into two by a half mirror 54, one portion of which scans a color video signal recording surface of the recorded film through a suitable optical system 55, 56. The transmitted flying spot light through the record film is photoelectrically converted by a photoelectric tube 57 to reproduce a color video signal. In this case, since the scanning for the reproduction must be effected under the same condition as that for the recording, a capstan motor 58 is driven by a constant frequency supply source 59 which is synchronously operated by the vertical driving signal VD and the capstan 52 is so driven that the film 18 travels at the constant speed of 60 frames per second. The cathode ray tube 53 is deflected by a horizontal deflection circuit 60 controlled by the horizontal driving signal HD. Perforations on the film 18 are detected by a detector 61 consisting of a light emissive diode and a photo diode and an output signal thus detected is amplified and shaped in an amplifier and shaping circuit 62 and then supplied to the constant frequency supply source 59 for driving the capstan motor 58 so as to control the rotation speed of the motor. The motor 58 is so controlled that the motion of the film 18 is synchronized with the flying scanner spot from the cathode ray tube and whereby the flying scanner spot can scan positively the recorded surface on the continuously traveling film 18 in the two-dimensional manner. In this embodiment, in order to generate a carrier for demodulating the carrier chrominance signal, the portion of the film 18 between two successive frames on which portion the reference signal pattern has been recorded is cut out and placed in a holder 63. This film portion is scanned repeatedly by the other flying spot light divided by the half mirror 54 through an optical system 81 and the transmitted light is photoelectrically converted by a photoelectric tube 64 to reproduce a demodulating carrier Sc.

The reproduced color video signal (Y + C) from the photoelectric tube 57 is amplified in a video amplifier 65 and then supplied to a low pass filter 66 and a high pass filter 67, respectively. The luminance signal Y derived from the low pass filter 66 is supplied to a delay circuit 69 and the carrier chrominance signal derived from the high pass filter 67 is supplied to synchronous detectors 70 and 71. On the other hand the reproduced carrier from the photoelectric tube 64 is supplied through a carrier amplifier 72, a band pass filter 73, a manual phase adjusting device 74 and an automatic phase adjusting device 75 to produce a carrier Sc' having the phase being adjusted. This carrier Sc' is directly supplied to the synchronous detector 70 and to the other synchronous detector 71 through a 90° phase shifter 76 and the carrier chrominance signal is synchronously detected with the phase of the reproduced carrier Sc' as the reference to demodulate color difference signals R-Y and B-Y. By the manual phase adjuster 74 the phase of the reproduced subcarrier is manually adjusted so as to remove the fixed initial phase difference between the demodulating carrier signal (which is obtained by reproducing the vertical burst signal pattern) and the carrier chrominance signal obtained from the film 18, which phase difference might be produced when the relative position in the horizontal directions between the reference signal pattern portion fixed in the holder 63 and the film 18 is not correct, whereby a demodulating error due to the phase difference can be obviated. The automatic phase adjuster 75 is to remove a phase variation between the above two signals due to transversal vibrations of the film 18 during its traveling. For this purpose, the video signal including the burst signal obtained by the video amplifier 65 is supplied to a gate circuit 77 controlled by the output from a front-back porch pulse generating circuit 80 which is synchronously driven by the horizontal driving signal HD. The horizontal burst signal passed through the gate circuit 77 is supplied to one of the input terminals of a phase comparator 78. To the other input terminal of the phase comparator 78 is supplied the demodulating carrier from the manual phase adjusting device 74. In the demodulating carrier the fixed phase difference has been removed. An output signal corresponding to a phase difference between the two signals from the phase comparator 78 is applied to the variable phase adjusting device 75 consisting of a variable delay circuit etc. as a signal for controlling a magnitude of delay time so that the phase of the demodulating carrier supplied to the synchronous detector 70 coincides with the phase of the horizontal burst signal. Thus demodulation errors due to transversal movements of the film can be completely removed. In the abovementioned manner, the luminance signal Y, the color difference signals R-Y and B-Y are reproduced. These signals are supplied to a color monitor 79 so as to reproduce a color image. The purpose of the delay circuit 69 is to make the phase of the color difference signal equal to that of the luminance signal.

Figure 8:
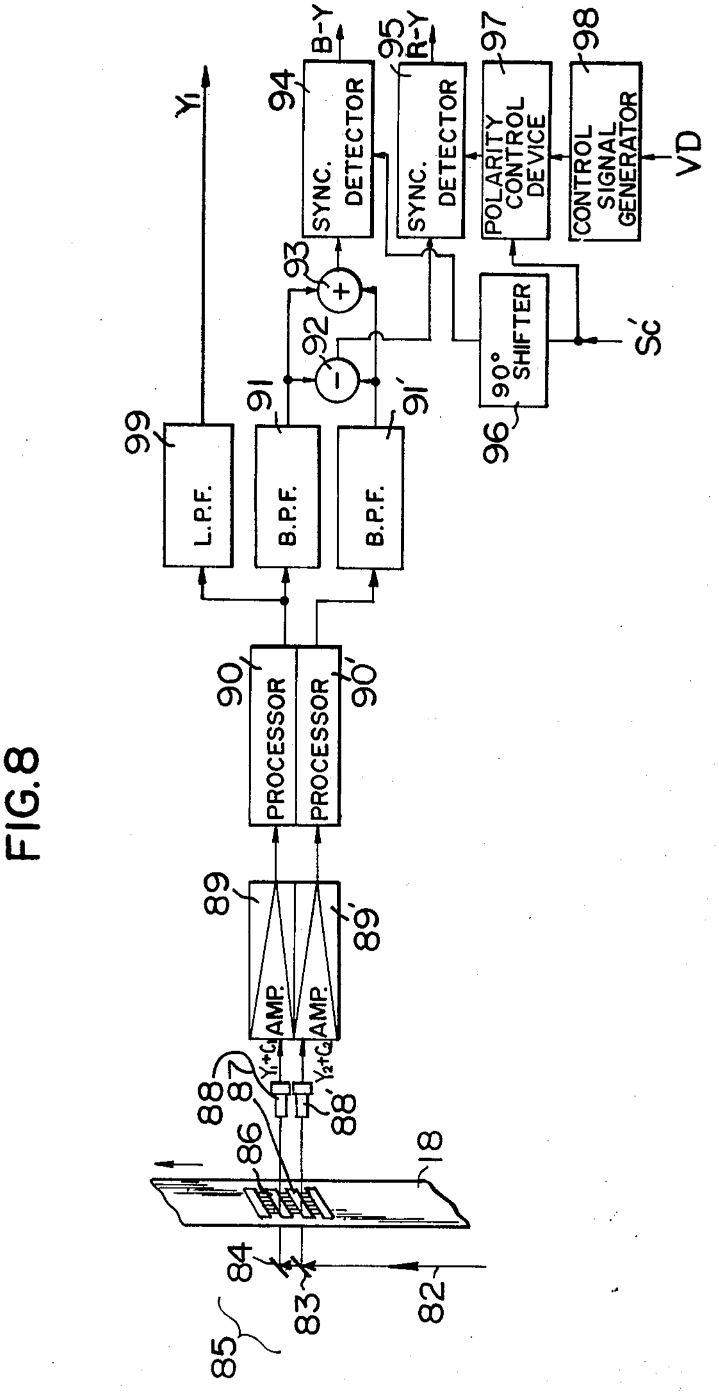
FIG. 8 is a modified embodiment of the reproducing device according to the present invention.

FIG. 8 shows principal parts of another embodiment of the reproducing apparatus according to the invention. This reproducing apparatus is to reproduce signals from a record film on which a composite color television signal consisting of one of two color difference signals (usually *R-Y*) with alternatively reversed phase field by field and of the luminance signal (hereinafter referred to PAF system). In FIG. 8, the parts which are common to FIG. 7 are omitted. In FIG. 8, the reference numeral 18 shows the film which has been recorded with the circuit part encircled by the chain line in FIG. 1 and has the recorded pattern shown in FIG. 2. This film is continuously moved at the speed of 60 frames/sec. by means of a film driving mechanism similar to that shown in FIG. 7 and scanned by a horizontal scanning light 82 produced by the similar means as that shown in FIG. 7. In the present embodiment, however, the horizontal scanning light 82 is divided into two horizontal scanning lights which are spaced apart from each other by a distance equal to the pitch of the frames on the record film 18 by means of an optical system 85 consisting of a half mirror 83 and a usual mirror 84. Two successive frames, for example, the frames 86 and 87 shown in FIG. 8 are simultaneously scanned by these two scanning lights. Then the transmitted scanning lights through these two frames are received by photoelectric tubes 88 and 88', respectively and are photoelectrically converted. Color video signals $Y_1 + C_1$, $Y_2 + C_2$ thus obtained have the phase difference corresponding to one field period of the television signal. These reproduced color video signals $Y_1 + C_1, Y_2 + C_2$ are supplied to amplifiers 89, 89', processors 90, 90' including gamma correction devices, and band pass filters 91, 91' to derive carrier chrominance signal components $C_1$, $C_2$ and these carrier chrominance signal components are supplied to a subtractor 92 and an adder 93 to produce a difference and a sum signal thereof. For example, if the carrier chrominance signal $C_1$ of color video signal $Y_1 + C_1$ of one field reproduced from the frame 86 is $$(R\text{-}Y)\cos\omega ct+(B\text{-}Y)\sin\omega ct,$$

the carrier chrominance signal $C_1$ of the color video signal $(Y_2 + C_2)$ of one field reproduced from the other frame, i.e., the frame 87 becomes $$C_2=-(R\text{-}Y)\cos\omega ct+(B\text{-}Y)\sin\omega ct.$$

Therefore, the difference signal obtained by the subtractor 92 becomes $2(R - Y)\cos\omega ct$ and the sum signal obtained by the adder 93 becomes $2(B\text{-}Y)\sin\omega ct$. These difference and sum signals are supplied to synchronous detectors 94 and 95, respectively. The demodulating carrier Sc' obtained by reproduction and by phase correction by means of similar means as shown in FIG. 7 is supplied to the synchronous detector 95 with the reference phase and to the synchronous detector 94 with 90° phase shift through a 90° phase shifter 96 and synchronous detections are carried out in these detectors.

In this case, the polarity of the carrier with the reference phase supplied to the synchronous detector 95 is reversed at the field period by means of a polarity control device 97 operated by a control signal from a control signal oscillator 98 which is driven by the vertical driving signal VD. This is necessary due to the fact that since the carrier chrominance signals $C_1$, $C_2$ in the color video signal reproduced from the record film 18 has the phase which is reversed alternatively field by field, the difference signal obtained from the subtractor 92 becomes $2(R\text{-}Y)\cos\omega ct$ and $-2(R\text{-}Y)\cos\omega ct$ alternatively and its polarity is reversed alternatively field by field, so that the phase of the demodulating carrier Sc' must be reversed in correspondence with the above phase reverse period.

On the other hand for the luminance signal, any one of the two reproduced color video signals $Y_1 + C_1$, $Y_2 + C_2$, for example, first field color video signal $Y_1 + C_1$ reproduced from the frame 86 is derived from the output of the processor 90 and supplied to the low pass filter 99 so as to obtain the luminance signal $Y$. Thus the color difference signals $(B - Y)$, $(R - Y)$and the luminance signal $Y$ can be reproduced.

According to the invention both the reproduced video signal and the reproduced reference signal (demodulating carrier) include phase variation components due to scanning distortions of the FSS cathode ray tubes in the recording system and in the reproducing system, so that upon reproduction the phase variation components in both signals are compensated by each other and color distortion never occurs. Moreover, since the carrier frequency is choosen to be an integer-multiple of the horizontal scanning frequency, a phase of each line of the recorded image becomes in phase with each other and also a phase of the reference signal pattern between two successive frames becomes in phase, whereby even when a retrace of these records is not effected completely, the video signal can be reproduced. Moreover, according to the invention, since the reference signal is recorded between two successive frames of the record film, it is not necessary to suppress a part of the video signal bandwidth for recording the reference signal with being superimposed on the video signal in the same frame of the record film as in known systems, so that a reproduced image of good quality can be obtained and an interfering line image does not occur.

In the embodiment shown in FIG. 8, there is an advantage that phase distortions of the carrier chrominance signal produced in the recording system and the reproducing system are compensated in two successive fields simultaneously reproduced and converted into comparatively small amplitude distortions.

As can be seen from the above explanation, according to the invention, the color video signal and the carrier signal of the color television signal are recorded on the record film in the form of the recording pattern shown in FIG. 2 and are simultaneously reproduce.

The following embodiments relate to apparatuses for simultaneously reproducing the color video signal and the carrier from the record film according to the invention.

Figures 9, 10:
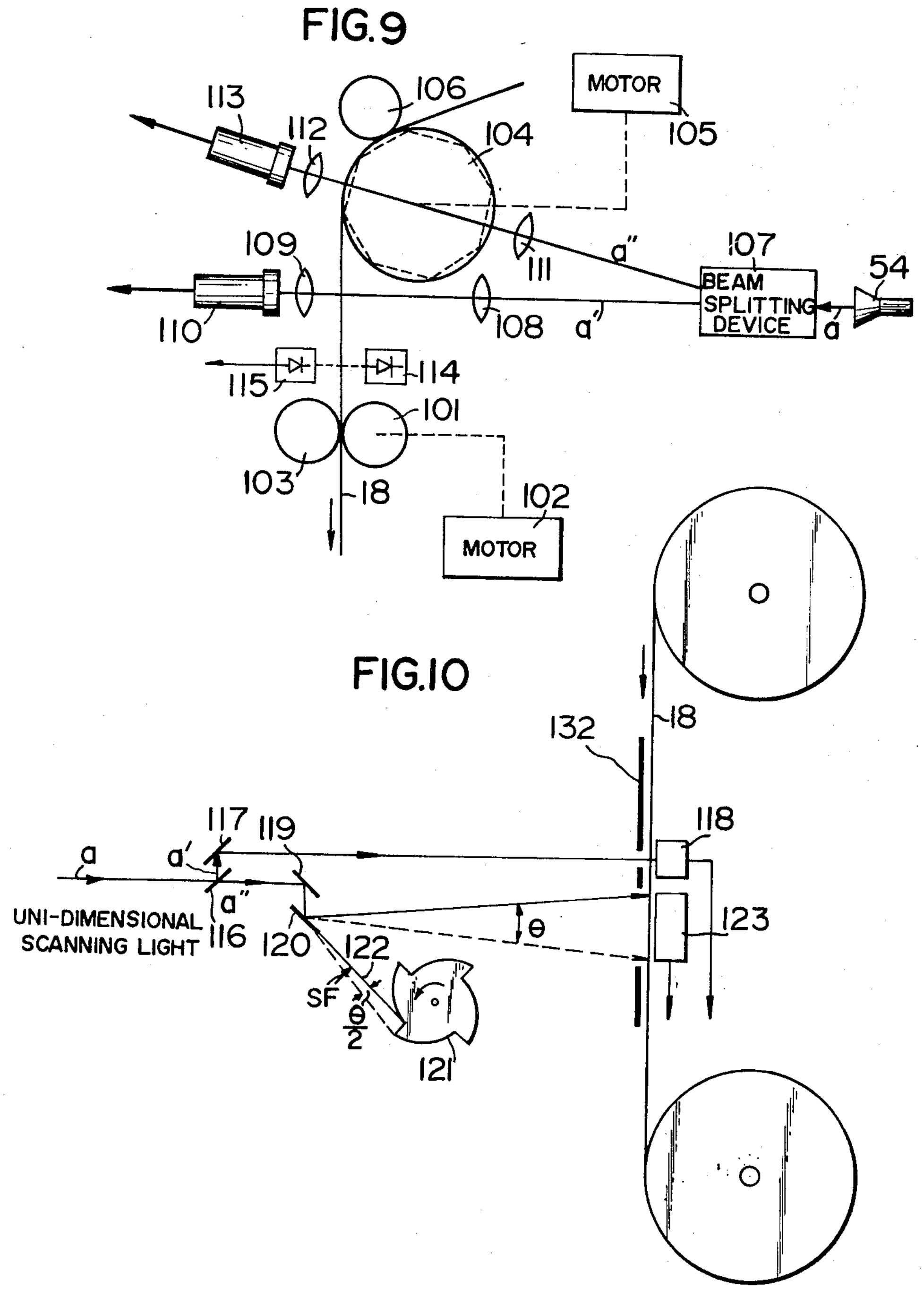
FIG. 9 is a simplified diagram showing the principle of simultaneous scanning by a uni-dimensional scanning light for both the frame portion recording the color signal and the frame portion recording the carrier wave, wherein a rotating prism is employed.
FIG. 10 is other embodiment showing the same constructive part using a rachet mechanism and vibrating mirror.

FIGS. 9 – 11 show embodiments wherein the color video signal recording portions 23, 23', . . . and the carrier recording portions 24, 24', . . . recorded at positions corresponding to the vertical flyback period of the recording pattern shown in FIG. 2 are simultaneously scanned by the same horizontal scanning light.

In FIG. 9, the reference numeral 18 denotes the record film shown in FIG. 2, 101 a capstan for driving the film 18, 102 a driving motor for the capstan 101, 103 a pinch roller arranged opposite to the capstan 101, 104 a rotary prism which also operates as a film driving mechanism, and 106 a pinch roller arranged opposite to the rotary polygonal prism 104.

Upon reproduction of the recorded information on the film 18, the capstan 101 and the rotary prism 104 are driven by the motors 102 and 105, respectively and the film 18 is continuously moved at the speed of 60 frames/sec. At the same time, a uni-dimensional scanning light is produced by a uni-dimensional scanning light generating device 54 including, for example, a uni-dimensional flying spot scanning cathode ray tube and the light $a$ thus generated is divided into two uni-dimensional scanning lights $a'$ and $a''$ by means of a beam splitting device 107, for example, a Dach prism. The light $a'$ is focussed on the film 18 by means of a lens 108 and scans the color video signal recorded on the film. The transmitted scanning light through the film is modulated in its intensity in accordance with density variations of images on the film and is incident upon a photoelectric tube 110 through a condenser lens 109. In the tube 110 the received light photoelectrically converted to produce the reproduced color video signal. The other light $a''$ divided by the beam splitter 107 irradiates the film 18 via a lens 111 and the rotary polygonal prism 104. The rotary polygonal prism 104 is provided with guide rings at its both side edges. These guide rings contact with both edges of the film 18. The film 18 is moved by the pinch roller 106 with contacting with the guide rings. The rotary prism 104 is so rotated by the motor 105 controlled by the vertical driving signal VD or a signal related to the perforations of the film 18 that the circumferential velocity of the guide rings coincides with the traveling speed of the film. Thus the scanning light emanating from the rotary prism retraces repeatedly the given portion of the film 18 at a period of each prism face passing through the horizontal scanning light $a''$. Therefore, when the scanning position is so set that it scans the portion between two successive frames of the film 18, the carrier wave recorded on the portion of the film between two successive frames can continuously be reproduced as an output from the photoelectric tube 116. The transmitted light through the film 18 is incident upon a photoelectric tube 113 through a lens 112 and thus the carrier wave can be reproduced simultaneously with the color video signal by the photoelectric conversion.

The rotating speed of the motor 105 for driving the rotary prism 104 is controlled in relation to the perforations of the film by a light emissive element 114, for example, a photo emissive diode and a photo-sensitive element 115, for example, a photo diode so as to obtain the given constant speed of the film like the embodiment previously explained. The motor for driving the capstan is fed from the alternating current supply source synchronized with the vertical driving signal in the same manner as the embodiment shown in FIG. 7. Then the luminance signal and the color difference signals can easily be reproduced from the reproduced color video signal and carrier wave by the same means as the abovementioned embodiment.

FIG. 10 shows another embodiment of the scanning device for simultaneously scanning the frame portion of the film 18 recording the color video signal and the portion between two successive frames recording the carrier wave.

A uni-dimensional scanning light a produced by the cathode ray tube 53 shown in FIG. 7 is divided into two lights $a'$ and $a''$ by a semitransparent plane mirror 116. One light $a'$ is reflected by a plane mirror 117 and scans the film surface. The transmitted light through the film is photoelectrically converted by a photoelectric tube 118 to reproduce the color video signal. The other light $a''$ scans two-dimensionally the surface of the film 18 by means of a plane mirror 119 and a plane mirror 120 which is vibrated at the period of the vertical synchronization by suitable means.

In the embodiment shown in FIG. 10, use is made of a ratchet wheel 121 rotating at a speed corresponding to the period of the vertical driving signal VD and an end of a spring rod 122 connected to the plane mirror 120 is urged against the ratchet wheel 121 by the spring force SF and the plane mirror 120 is rotated by an angle of $\theta/2$. During the time light $a'$ scans successively each frame of the continuously traveling film, the light $a''$ can scan continuously the portion between the related two successive frames and the transmitted light is photoelectrically converted by a photoelectric tube 123 into the reproduced carrier wave. It should be noted in this case that the rotating speeds of the ratchet wheel 121 and the film driving mechanism are controlled in the manner explained above with reference to FIG. 7.

In FIG. 10, a reference numeral 132 shows a mask provided along the surface of the film 18.

Figure 11A:
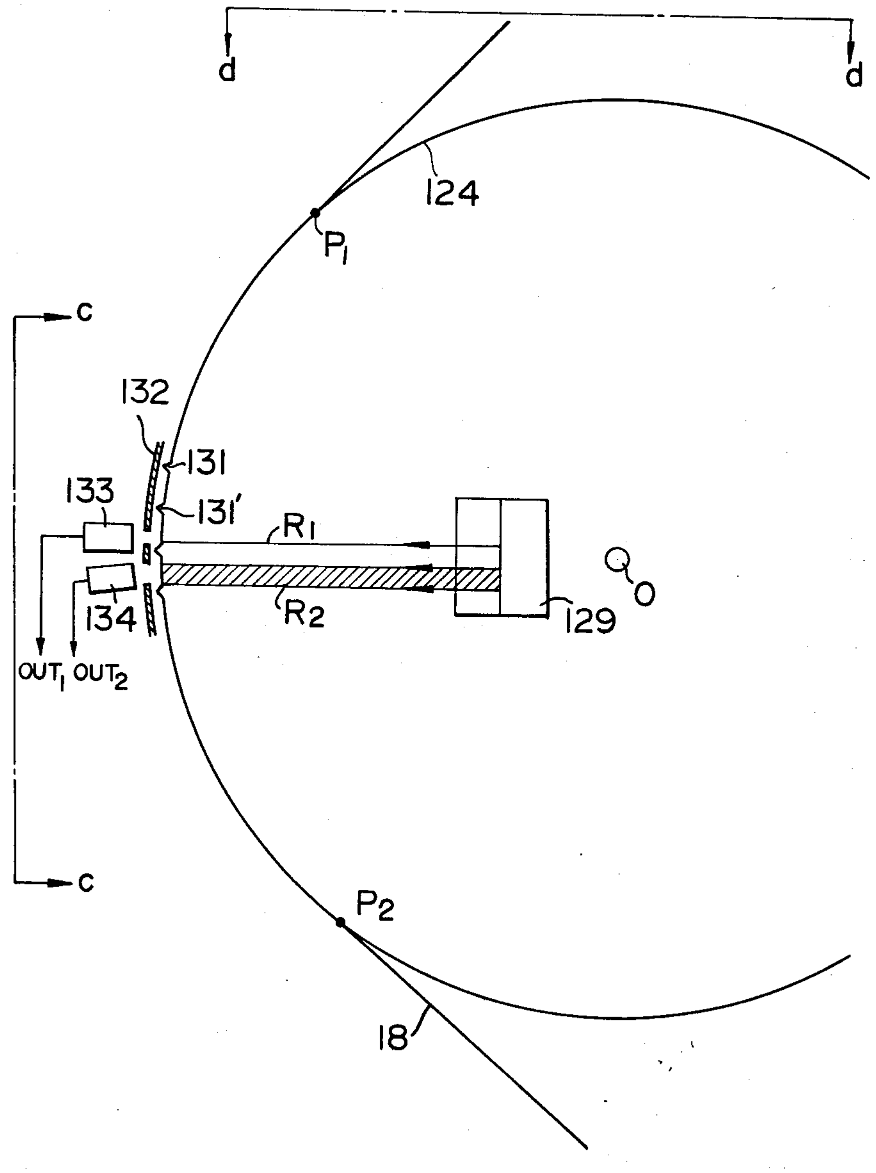
FIG. 11*a* shows a side view of a further embodiment using an anamorphic lens.
Figures 11B, 11C:
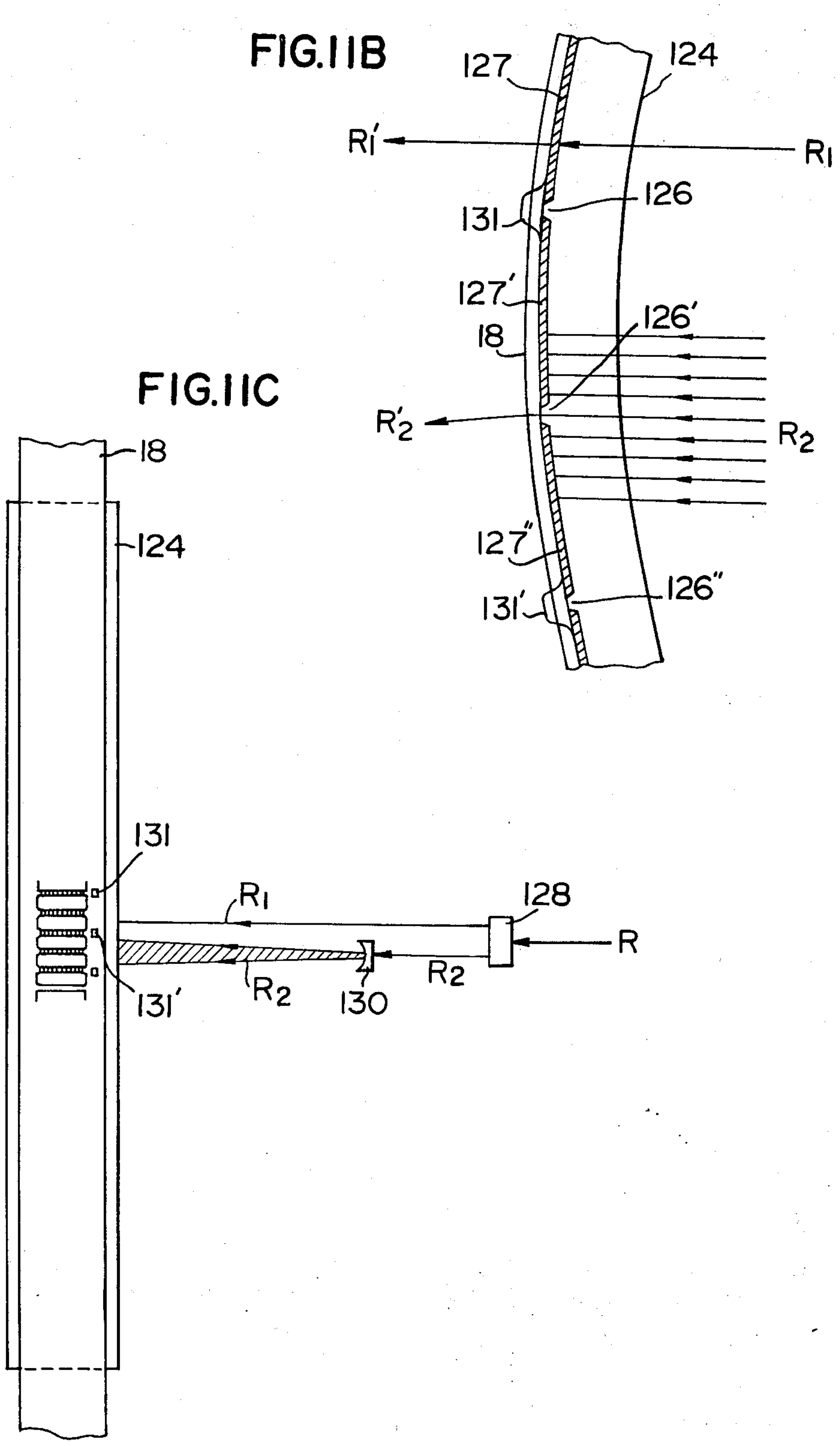
FIG. 11*b* shows an enlarged partial view of the side view.
FIG. 11*c* shows a front view as seen in the direction of arrow *c* in FIG. 11*a;*
Figure 11D:
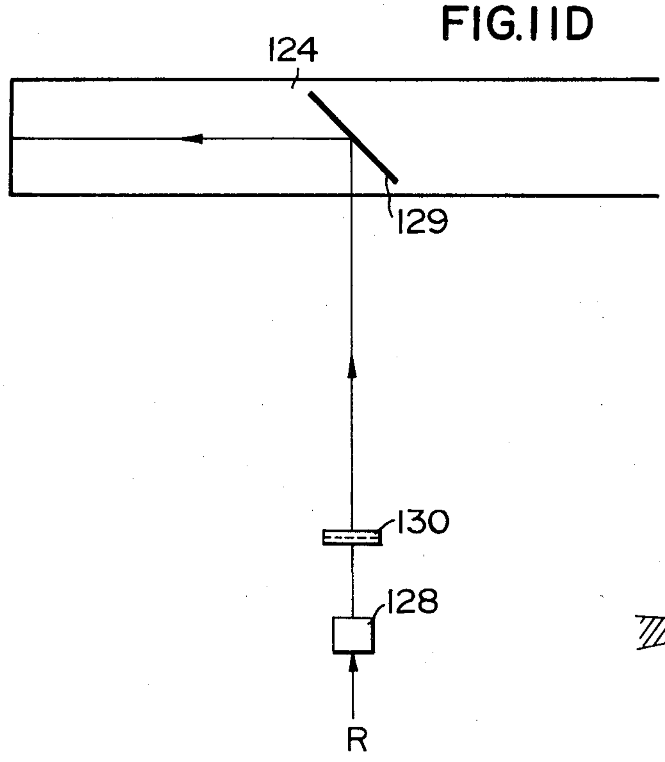
FIG. 11*d* shows a plan view showing the route of the light as seen in the direction of arrow *d* in FIG. 11*a;*

FIGS. 11*a* and 11*b* show a further embodiment of the scanning apparatus for simultaneously scanning the color video signal recording portion and the carrier wave recording portion between the two successive color video signal recording portions of the film shown in FIG. 2 by using an anamorphic lens.

FIG. 11*a* is a side view of principal parts of the apparatus and a reference numeral 124 shows a cylindrical drum arranged to be rotatable about an axis 0. The width of the peripheral surface of the cylindrical drum 124 is slightly wider that the width of the film 18 to be reproduced. The film 18 is arranged to contact with the peripheral surface of the drum 124 along a part of its periphery, for example, from a point $P_1$ to a point $P_2$. On the peripheral surface of the cylindrical drum 124 are provided claws 131, 131' engaging with the perforations of the film 18 so as to place the film 18 in position. FIG. 11B shows a detailed construction. In FIG. 11B the cylindrical drum 124 is formed of non-colored transparent glass and on its surface red optical filters 127, 127', 127'', . . . are applied along the whole peripheral surface with interposing therebetween gaps 126, 126', 126'', . . . (hereinafter referred to slits as) having a length of about 100$\mu$s in the direction of the axis of the cylindrical drum in such a manner that when the film 18 is positioned as above mentioned, each frame of the film 18 completely coincides with each of the red filters 127, 127', . . . and each of the carrier wave recording portions completely coincides with each of the slits 126, 126', . . .

Figure 11E:
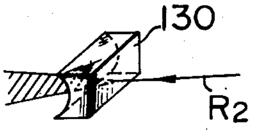
FIG. 11*e* shows a perspective view showing an anamorphic lens used in the device as shown in FIGS. 11*a–d;*
Figure 12:
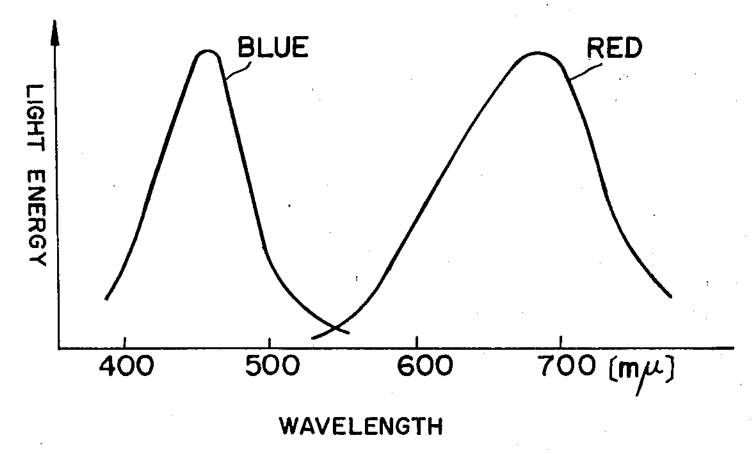
FIG. 12 is a graph showing the characteristic curve of the spectro graph of the uni-dimensional light in the embodiment shown in FIG. 11.

FIG. 11*c* is a front view of the apparatus viewd from the direction shown by arrow *c* in FIG. 11*a*. In FIG. 11*c*, a uni-dimensional scanning light beam *R* is incident upon a dichroic mirror 128. This scanning light beam R scans uni-dimensionally the film 18 in the perpendicular to the plane of the drawing. The scanning light beam *R* includes wave length components of red and blue as shown in FIG. 12. The scanning light beam *R* is divided by the dichroic mirror 128 into a red component $R_1$ and a blue component $R_2$. Then the red component $R_1$ is reflected by a plane mirror 129 arranged inside of the cylindrical drum 124 to pass through the red filter 126 applied on the cylindrical wall of transparent glass drum 124 from the inside of the drum 124 and to scan horizontally the portion of the film 18 recording the color video signal. On the other hand, the blue component $R_2$ divided by the dichroic mirror 128 is spread up and down (in the direction of the traveling of the film) by means of a concave lens 130 (anamorphic lens) having a cylindrical surface on one side as shown in FIG. 11*e* and converted into a wide uni-dimensional scanning light and then is changed its direction by the plane mirror 129 so as to scan uni-dimensionally the surface of the film 18. In this case the width of the blue component $R_2$, spread by means of the anamorphic lens 130, which inpinges on the film surface is made equal to a length of the pitch of the frame on the film 18 or slightly wider than it.

The transmitted light of uni-dimensional scanning of the red component $R_1$ through the film 18 is incident on a photo-multiplier 133 through a slit of the mask 132 as shown in FIG. 11*a*.

The transmitted light of wide uni-dimensional scanning beam consisting of the blue component is also incident on a photo-multiplier 134 arranged at a position receiving the transmitted light. In such a construction, the cylindrical drum 124 is rotated at such a rotating speed that when the surface of the film arrested by the ratchets 125, 125', . . . corresponding to one field of the recorded color television signal is scanned by the uni-dimensional scanning light consisting of the red component, plane scanning has been just completed in one field period.

The scanning light of blue component $R_2$ does not pass through the red filters 127, 127', . . . and passes through only the transparent slits 126, 126', . . . , so that during the scanning light of red component $R_1$ scans each field, a part of the blue component $R_2$ passes through the slit 125 and scans repeatedly the carrier wave recording portion between two successive frames recording the color video signal of each field for a period during which the carrier wave recording portion passes through an elongated area on which the blue component scanning light spread by the anamorphic lens in the vertical direction is incident. Such scanning is effected for each slit. Thus the color video signal and the reference carrier for demodulating the carrier chrominance signal can be continuously reproduced.

It is well-known without further explanation that the uni-dimensional scanning light having the spectral characteristics shown in FIG. 12 can easily be obtained by suitably selecting phosphorous material to be applied on the phosphorous screen of the cathode ray tube.

Figure 13:
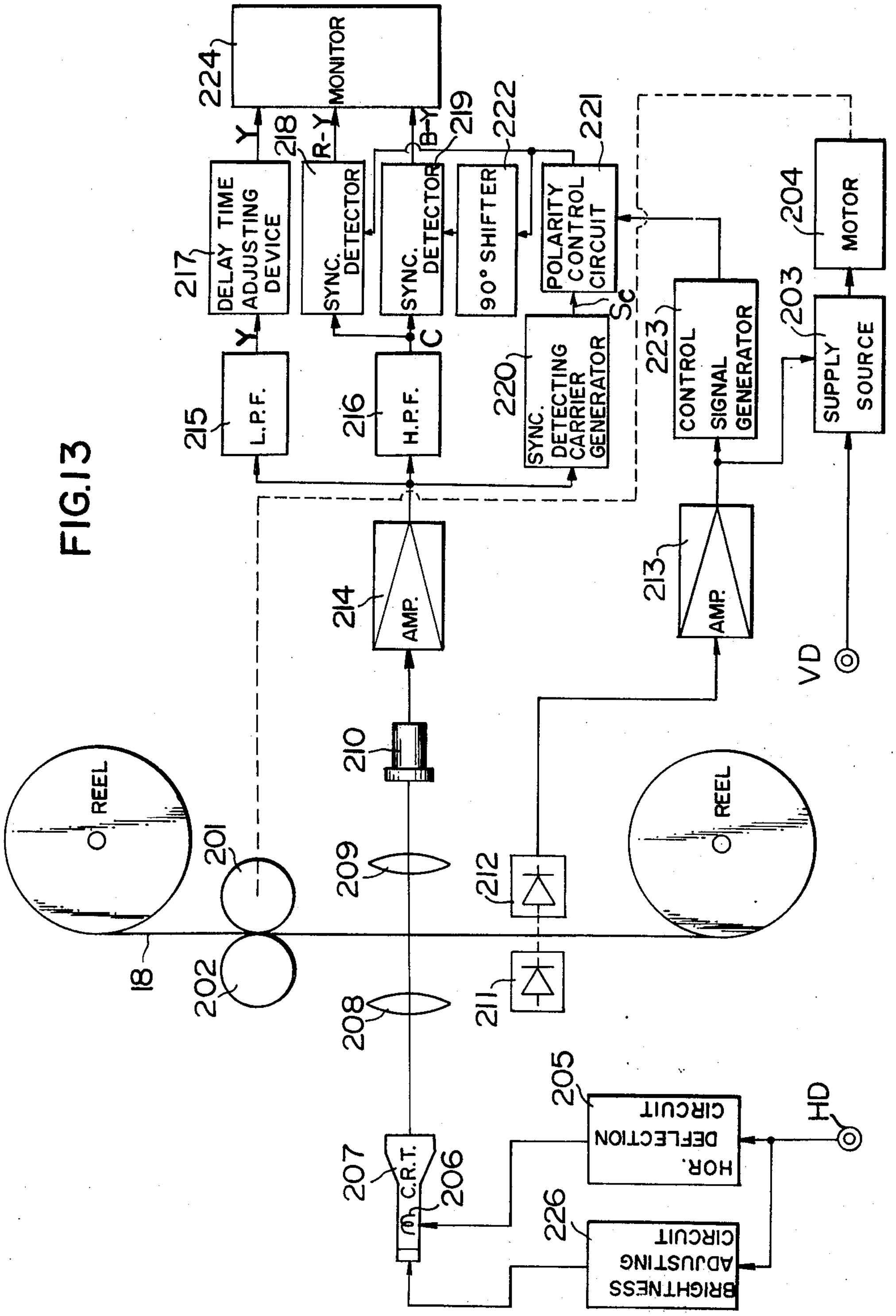
FIG. 13 shows a block diagram of an embodiment of the color television signal reproducing device reproducing the signal from a film shown in FIG. 2.

FIG. 13 shows a further embodiment of the scanning apparatus in which the record film is scanned by a single uni-directional scanning light to reproduce the color television signal.

In FIG. 13, 18 is the record film having the recording pattern shown in FIG. 2, 201 is a capstan for running the record film 18 and 202 is a pinch roller for the capstan 201.

The capstan 202 is driven by a motor 204 operated by an alternating current supply source 203 a frequency of which is controlled by the vertical driving signal VD and the film 18 is moved at the speed of 60 frames/sec. At the same time the horizontal driving signal HD is supplied to a horizontal deflection coil 206 through a horizontal deflection device 205 and a light beam of a light generating device 207, for example, a flying spot scanning (FSS) tube is deflected in the horizontal direction to produce a unidimensional scanning light. This scanning light scans a recorded image of the film 18 through a lens 208 so as to obtain the transmitted light modulated in its intensity in accordance with density variations of the image on the film. The transmitted light is incident upon a photoelectric tube 210 via a condensor lens 209 and converted into an electric signal. The brightness of the light produced by the light generating device 207 may be adjusted by a brightness adjusting device 226. The rotating speed of the motor 204 may be so controlled that the film always travels at the constant speed by projecting light emitted from a light generating element 211, for example, a light emissive diode onto a photosensitive element 212, for example, a photo diode through the perforations of the film 18 and converting it into an electric signal and after amplifying and shaping it in an amplifying and shaping circuit 213, supplying it to the supply source 203.

Figure 14:
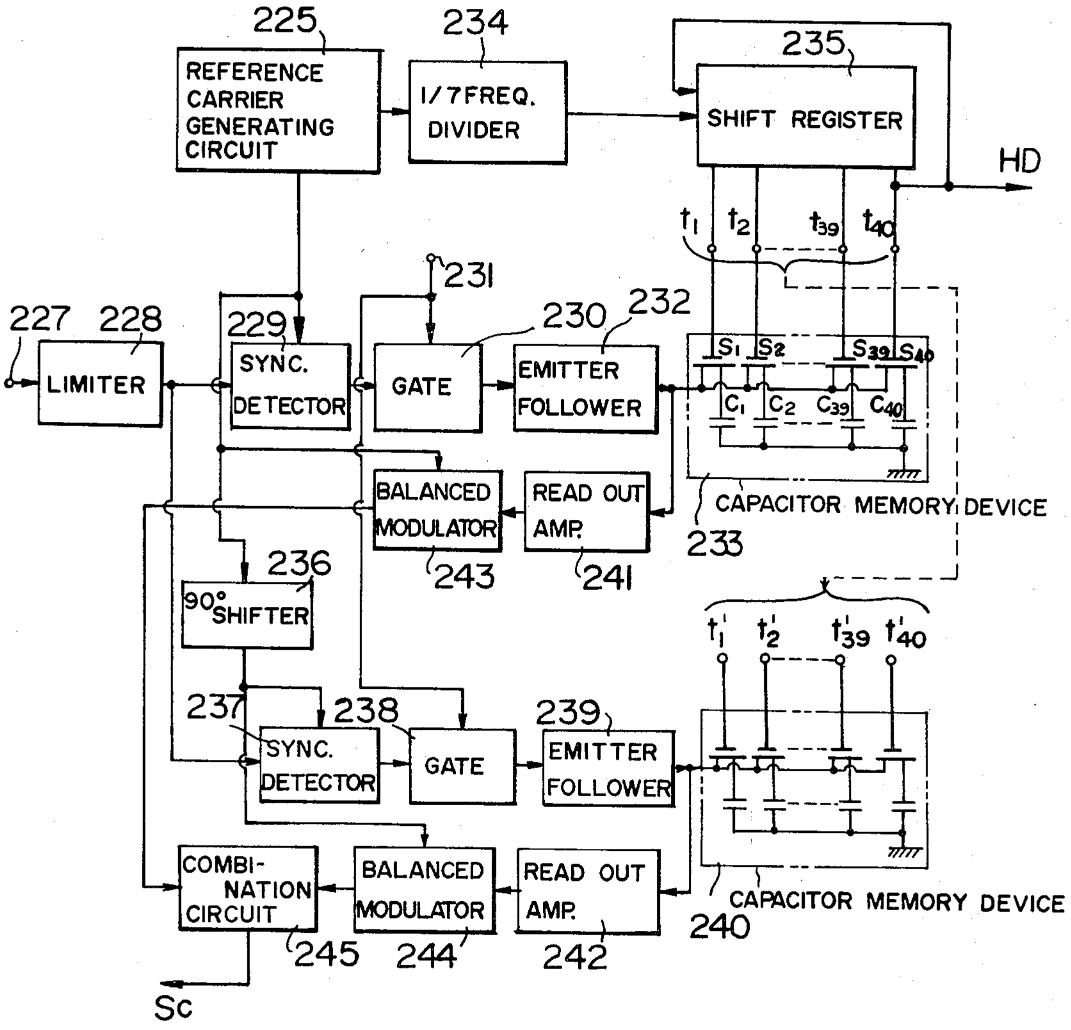
FIG. 14 shows a block diagram of the practical circuit of producing a carrier wave for detecting the synchronization used in the device shown in FIG. 13.

It should be noted that the electric signal obtained by the photoelectric conversion in the photoelectric tube 210 consists of the color video signal and the carrier signal existing during the vertical blanking period of the color video signal. The composite signal thus obtained is amplified in an amplifier 214 and then supplied to a low pass filter 215 and a high pass filter 216, respectively. The luminance signal from the low pass filter 215 is derived through a delay time adjusting device 217. On the other hand the carrier chrominance signal *C* from the high pass filter 216 is supplied to synchronous detectors 218 and 219, respectively. At the same time, a part of the output of the amplifier 214 is supplied to device 220 producing a carrier for a synchronous detection (a detailed circuit diagram of which is shown in FIG. 14). The carrier wave produced by the device 220 is supplied to the synchronous detector 218 through a polarity control circuit 221 and synchronously detects the carrier chrominance signal C to demodulate the color difference signal *R-Y*. To the other synchronous detector 219 the carrier wave is supplied from the polarity control circuit 221 through a 90° phase shifter 222 and the carrier chrominance signal C is synchronously detected so as to demodulate the color difference signal *B-Y*. A control signal generator 223 is controlled by the signal related to the perforation of the film 18 from the amplifier 213 and a control signal is supplied to the polarity control circuit 220 so that the polarity of the carrier for synchronous detection supplied to the synchronous detectors 218, 219 is reversed at the period of the perforation by the polarity control circuit 220 so as to make the phase of the carrier equal to that of the carrier at the recording.

The color difference signals *R-Y* and *B-Y* and the luminance signal *Y* being delayed by the delay time adjusting device 217 are supplied to, for example, a color monitor 224 to reproduce a color image.

FIG. 14 shows a detailed construction of the device 220 for producing the carrier wave for the synchronous detection. In FIG. 14, reference numeral 225 shows a reference carrier oscillator for producing a continuous signal with a crystal oscillator having an oscillating frequency of, for example, 280 fh (fh is the horizontal scanning frequency). The composite signal consisting of the color video signal and the reference signal supplied to an input terminal 227 from the amplifier 214 shown in FIG. 13 is passed through a limiter 228 having a suitable limiting level to remove noise, etc., and then supplied to the synchronous detector 229. The synchronous detection is effected with the reference carrier frequency supplied from the reference carrier oscillator 225. The detected signal is supplied through the conductive gate circuit 230 controlled by the vertical blanking signal supplied from a terminal 231 so as to obtain a signal corresponding to a phase deviation between the reproduced carrier existing in the vertical blanking period of the reproduced composite signal and the carrier supplied from the oscillator. This signal is sequentially stored in the analog form in capacitors of the capacitor memory device 233 at a suitable sampling slot (width) through an emitter follower circuit 232. In one example, the sampling interval is about 1.5$\mu$ sec. and then 40 capacitors are necessary for one line. In this case the capacitor memory device may be constructed by 40 switching elements (for example, field effect transistors) $S_1$ –$S_{40}$ and 40 capacitors $C_1$ – $C_{40}$. The sequence and the manner of the storage will be explained below.

The oscillating frequency of 280 fh from the reference carrier oscillator 225 is divided by seven in a frequency divider 234 and then supplied to a 40 bit shift register 235. The first pulse from the shift register 235 operates the switching element $S_1$ through a terminal $t_1$ and the signal supplied from the emitter follower circuit 232 is stored in the capacitor $C_1$; by means of the second pulse the switching element $S_2$ becomes conductive through a terminal $t_2$ and the signal from the emitter follower circuit 232 is stored in the next capacitor $C_2$. This same operation is carried out successively and the signals are stored in the capacitors $C_3$ – $C_{40}$. When the signal corresponding to the phase deviation of the reproduced carrier signal in a single scanning line has been stored, the signal corresponding to the phase deviation of the reproduced carrier in the next scanning is stored in the capacitors $C_1$ – $C_{40}$ in the abovementioned manner and thus concerning the carrier recorded between two successive frames on the film 18, the signals corresponding to phase deviations between the reproduced carrier signal and the output from the oscillator 225 are repeatedly stored in the capacitors $C_1$ – $C_{40}$.

At the same time, the carrier frequency generated from the reference carrier oscillator 225 is shifted by 90° in a 90° phase shifter 236 and the signal supplied from the limiter 228 is synchronously detected by the shifted carrier in a synchronous detector 237. The signal thus detected is stored in a capacitor memory device 240 similar to the abovementioned capacitor memory device 233 through a gate circuit 238 which conducts for only the vertical blanking period and an emitter follower circuit 239 in the same manner as above. Terminals $t'_1$ – $t'_{40}$ of the capacitor memory device 240 are connected to the terminals $t_1$ – $t_{40}$, respectively of the 40 bit shift register 235 so that the capacitor memory device 240 is operated in the same manner as the capacitor memory device 233.

During the field scanning, the signals stored in the capacitors of the capacitor memory devices 233 and 240 are read-out by means of read-out amplifiers 241 and 242 and the read-out signals are supplied to balanced modulating circuits 243 and 244, respectively. The reference carrier supplied from the reference carrier oscillator 225 directly and through a 90° phase shifter 236 to the balanced modulating circuits 243 and 244, respectively, are modulated in the balanced mode and the modulated signals are combined in a vector form by a combination circuit 245 to produce the demodulating carrier Sc in accordance with phase deviations of the reproduced reference signal.

Figure 15A:
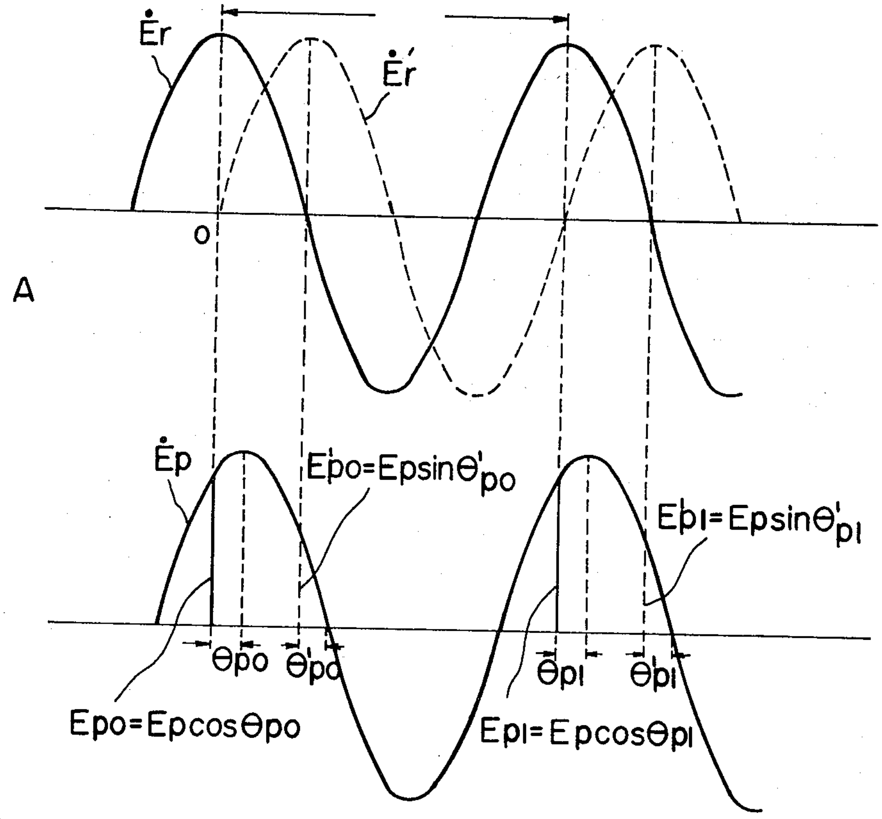
FIG. 15*a* shows wave forms for explaining the operation of the device shown in FIG. 14.

Now the abovementioned circuit will be analyzed mathematically with reference to waveforms shown in FIG. 15*a*. It is assumed that the reference carrier wave generated from the reference carrier oscillator 225 is $Er\cos\omega t$, wherein $\omega r$ is an angular frequency of the oscillation. It is furthermore assumed that the reproduced carrier wave obtained by scanning the vertical blanking period is $Ep\cos(\omega rt+p)$, wherein $\theta p$ is the phase difference between the reproduced carrier and the reference carrier generated from the oscillator 225 and the magnitude of $\theta p$ varies in accordance with a linearity of the horizontal deflection scanning of the scanning optical system for reproduction shown in FIG. 13. In the synchronous detector 229, when the reproduced carrier $Ep\cos(\omega rt+p)$ is detected with sampling by the reference carrier $Er\cos\omega rt$, its outputs become as follows as can be seen from FIG. 15*a*.

$$Ep_0 = Ep\cos(\theta - p_0) = Ep\cos\theta p_0$$

$$Ep_1 = Ep\cos(2\pi - \theta p_1) = Ep\cos(-\theta p_1) = Ep\cos\theta p_1$$

$$Epn = Ep\cos(2n\pi - \theta pn) = Ep\cos(-\theta pn) = Ep\cos\theta pn$$

When in the synchronous detector 237 the reproduced carrier $Ep\cos(\omega rt+p)$ is detected by sampling with the reference carrier Er (in FIG. 15*a* shown by dash line) shifted by 90° in the 90° phase shifted 236, the following outputs are obtained.

$$E'p = Ep\cos\left(\frac{\pi}{2} - \theta' p_0\right) Ep\sin\theta' p_0$$

$$Ep_1 = Ep\cos\left(2 + \frac{\pi}{2} - \theta' p_1\right) = Ep\sin\theta' p_1$$

$$Epn = Ep\cos\left(2n\pi + \frac{\pi}{2} - \theta' pn\right) = Ep\sin\theta' pn$$

It is now assumed that in a period of $(\tau/4)(\tau = 2\pi/\omega r)$, a variation of phase is negligibly small, then $\theta p_0 = \theta' p_0$, $\theta p_1 = \theta p'_1 \ldots \theta pn = \theta' pn$. Therefore, the outputs from the synchronous detector 237 can be rewritten as follows.

$$E'p_0 = Ep\sin\theta p_0$$

$$E'p_1 = Ep\sin\theta p_1$$

$$E'pn = Ep\sin\theta pn$$

$Ep_0$, $Ep_1$, $Ep_2 \ldots$ Epn are sequentially stored in the capacitors of the capacitor memory device 233 and $E'p_0$, $E'p_1$, $E'p_2, \ldots$ E'pn are sequentially stored in the capacitors of the capacitor memory device 240.

If variations of phases in successive outputs *Ep* and *Ep'* are small, it is enough to effect the sampling with $\nu\tau$ ($\nu$ a positive integer) instead of $\tau$. Therefore, the number of the capacitors of the capacitor memory device may be reduced by $\nu$ times. In this case in the successive capacitors of the capacitor memory device 233, $Ep\nu_0 = Ep\cos\theta p\nu_0$, $Ep\nu_1 = Ep\cos\theta p\nu_1$, $Ep\nu_2 = Ep\cos\theta p\nu_2, \ldots$ are sequentially stored and in the successive capacitors of the capacitor memory device 240, $E'p\nu_0 = Ep\sin\theta p\nu_0$, $E'p\nu_1 = Ep\sin\theta p\nu_1$, $E'p\nu_2 = Ep\sin\theta p\nu_2, \ldots$ are sequentially stored.

In order to produce a synchronizing signal, i.e., *Ep* for detecting in the field scanning the chrominance signal transmitted in the form of the carrier suppressed modulation system, $Ep\nu_0$, $Ep\nu_1$, $Ep\nu_2, \ldots$ are successively read-out from the capacitor memory device 233 and the carrier wave Ep supplied from the oscillator 225 is modulated in the balanced mode in the balanced modulator 243 by the read-out magnitudes. Then the following signals are obtained.

$$Ed_0 = Ep\nu_0 \cdot \cos\omega rt = Ep\cos\theta p\nu_0 \cdot \cos\omega rt$$

$$Ed_1 = Ep\nu_1 \cdot \cos\omega rt = Ep\cos\theta p\nu_1 \cdot \cos\omega rt$$

$$Ed_2 = Ep\nu_2 \cdot \cos\omega rt = Ep\cos\theta p\nu_2 \cdot \cos\omega rt$$

In the same manner, $E'p\nu_0$, $E'p\nu_1$, $E'p\nu_2 \ldots$ are successively read-out from the capacitor memory device 240 and then Er shifted by 90° is detected in the balanced mode by the read-out magnitudes to produce the following signals.

$$E'd_0 = E'p\nu_0(-\sin\omega rt) = Ep\sin\theta p\nu_0(-\sin\omega rt)$$

$$E'd_1 = E'p\nu_1(-\sin\omega rt) = Ep\sin\theta p\nu_1(-\sin\omega rt)$$

$E'd_2 = E'p\nu_2(-\sin\omega rt) = Ep\sin\theta p\nu_2(-\sin\omega rt)$ These two signals are combined in the combination circuit 245 to obtain the following signals.

$$Ed_0 = Ed_0 + E'd_0 = Ep\cos\theta p\nu_0 \cdot \cos\omega rt - Ep\sin\theta p\nu_0 \cdot \sin\omega rt = Ep\cos(\omega rt + \theta p\nu_0)$$

$$Ed_1 = Ed_1 + E'd_1 = Ep\cos\theta p\nu_1 \cdot \cos\omega rt - Ep\sin\theta p\nu_1 \cdot \sin\omega rt = Ep\cos(\omega rt + \theta p\nu_1)$$

$$ED_2 = Ed_2 + E'd_2 = Ep\cos\theta p\nu_2 \cdot \cos\omega rt - Ep\sin\theta p\nu_2 \cdot \sin\omega rt = Ep\cos(\omega rt + \theta p\nu_2)$$

Figure 15B:
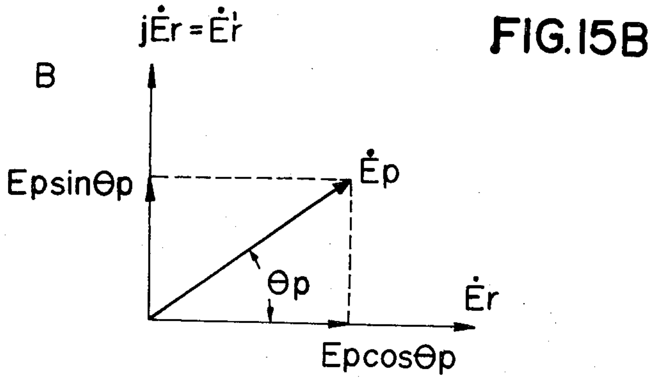
FIG. 15*b* is a vector diagram for explaining the operation of the device shown in FIG. 14.

Thus the output signal Ed obtained from the combination circuit 245 coincides with Ep and the synchronious signal, i.e., the carrier can be obtained. This may be represented in the vector form as shown in FIG. 15*b*.

As explained above in detail, according to the invention upon recording the color television signal, the reference carrier for demodulating the carrier chrominance signal is recorded on that portion of the recording film on which the color video signal is not recorded and upon reproduction the color video signal recording portion and the carrier wave recording portion are reproduced by the same scanning light, so that the following advantages can be obtained.

1. Since the color television signal can be recorded on the monochromic photographic film without deteriorating the image information for the color television signal, the definition can be improved as compared with known methods using the monochromic film.

2. In reproduction there is no influence due to a deviation of deflection of a uni-dimensional scanning light for reproduction, so that hue can be reproduced in high fidelity.

3. Since an influence of transversal vibration of the traveling film upon reproduction can be avoided, a variation of hue of a reproduced image due to this influence is very slight.

4. By combining the scanning line control apparatus according to the invention with the recording apparatus according to the invention, the color television signal can be recorded on the film with extremely high accuracy. Therefore, the television image reproduced from the record film according to the invention has very high quality.

What is claimed is:

1. A method of recording and reproducing a color television signal comprising the steps of:

superposing a sine-wave signal at both ends of each horizontal blanking period of a color video signal comprising the resultant signal resulting from combining a luminance information signal and a carrier chrominance information signal, which is a carrier wave modulated by color information signals;

recording the color video signal onto a recording medium such that one field of the color video signal is recorded in one frame of the continuously running recording medium by a uni-dimensional scanning beam modulated by the color video signal;

recording the carrier for reproducing the carrier chrominance information signal onto a portion of the recording medium where the color video signal is not recorded and which is placed between two successive frames of the recording medium recording the color video signal by said beam modulated according to the carrier;

controlling the length and center position of a scanning line produced by said unidimensional scanning beam to maintain said scanning line in the same position, including:

detecting deviations of positions of a sine-wave signal image produced by said sine-wave signals at each end of the scanning line to form control signals for adjusting the length and center position of said scanning line in relation to said deviations of said sine-wave signal image, and feeding back said control signals to a horizontal deflection circuit and a centering control circuit, respectively, to adjust the length and the center position of said scanning line;

reproducing the thus recorded color video signal and carrier after photoelectric conversion by scanning them by flying scanning spot lights originated from one light source for the portion of the recording medium recording the color video signal and the portion thereof recording the carrier; and demodulating the carrier chrominance signal by using the reproduced carrier as a reference signal.

2. A device for recording a color television signal on a photosensitive record medium, comprising in combination:

a carrier oscillator controlled by a horizontal driving signal;

a vertical blanking signal generator controlled by a vertical driving signal;

a first gate circuit connected to said carrier oscillator and controlled by a vertical blanking signal derived from said vertical blanking signal generator;

a dual balanced modulator for providing a carrier chrominance signal by modulating a carrier supplied from said carrier oscillator with color difference signals obtained from color signals of the color television signal to be recorded;

a combination circuit for producing a color video signal by combining said carrier chrominance signal onto a luminance signal derived from said color signals in a frequency interleaving manner and for superposing the carrier derived from said carrier oscillator and gated out via said first gate circuit onto said color video signal in a vertical blanking period;

a front and back porch pulse generator controlled by the horizontal driving signal;

a second gate circuit connected to said carrier oscillator and controlled by an output pulse of said front and back porch pulse generator to supply said carrier from said carrier oscillator to said combination circuit with a timing and for a period corresponding to front and back porches of a horizontal blanking period of the color video signal;

a cathode ray tube for producing a uni-dimensional scanning light having a brightness of a spot which is modulated by said color video signal and said carrier supplied from said combination circuit;

two sets of detecting means for photoelectrically detecting images of the carrier on both extreme ends of the uni-dimensional scanning light to produce detecting signals;

means for forming sum and difference signals from said detecting signals to produce a center control signal representing a magnitude and a direction of deviation of a center position of said uni-dimensional scanning light and a scanning length control signal representing a magnitude and a direction of deviation of a length of said uni-dimensional scanning light, respectively;

a centering control circuit for controlling the center of deflection of the uni-dimensional scanning light produced by said cathode ray tube with the aid of said center control signal;

a horizontal deflection circuit for controlling the length of said uni-dimensional scanning light by means of said scanning length control signal; and a video signal recorder in which the photosensitive record medium is continuously driven at a speed corresponding to the vertical driving signal and said uni-dimensional scanning light produced by said cathode ray tube is projected on said photosensitive record medium to record each field of said color video signal in each frame of said record medium and to simultaneously record the carrier supplied to the cathode ray tube through said first gate circuit in each interval between successive frames and the carrier supplied to the cathode ray tube through said second gate circuit at both extreme ends of each frame of said record medium.

3. A device for recording a color television signal on a photosensitive record medium as claimed in claim 2, further comprising:

means for detecting a signal representing the position of perforations of the record medium in the video signal recorder to produce a signal for reversing a polarity of the carrier supplied from said carrier oscillator to the dual balanced modulator with a timing corresponding to the vertical scanning period of the color television signal.

4. A device for reproducing a color television signal recorded on a photosensitive record medium, comprising:

means for continuously driving said record medium at a speed corresponding to a vertical scanning period of the color television signal recorded thereon, said record medium having recorded thereon successive field information of the color video signal in successive frames and carrier information in successive intervals between successive frames and at both sides of the frames, each of said intervals corresponding to a vertical blanking period of the color video signal and said both sides of the frames corresponding to front and back porches of a horizontal blanking period;

a cathode ray tube for producing a uni-dimensional scanning light of a constant brightness, a scanning frequency of said unidimensional scanning light being a function of the horizontal scanning frequency of the color video signal;

means for fixedly holding a record pattern which is substantially identical with the carrier pattern recorded in said intervals of said record medium;

means for dividing said uni-dimensional scanning light into two identical uni-dimensional scanning lights and for directing a first one of said two uni-dimensional lights to the record medium and a second one of said two uni-dimensional scanning lights to said record pattern;

means for receiving said first uni-dimensional scanning light transmitted through said record medium to reproduce the color video signal recorded in the frame and the carrier recorded at both sides of the frames;

means for receiving said second uni-dimensional scanning light transmitted through said record pattern to produce a carrier in the vertical blanking period;

means for deriving a carrier chrominance signal and a luminance signal from said reproduced color video signal;

means for producing a phase difference signal by comparing a phase of said reproduced carrier in the horizontal blanking period with that of said carrier produced by said record pattern in the vertical blanking period;

means for varying the phase of said carrier produced by said record pattern in accordance with said phase difference signal so that the phase of the carrier produced by said record pattern follows phase variations of the reproduced carrier in the horizontal blanking period due to lateral displacement of the running record medium to produce a reference carrier having a phase which is always matched to that of the reproduced carrier chrominance signal; and means for demodulating color difference signals from said carrier chrominance signal with the aid of said reference carrier.

5. A device for reproducing a color television signal recorded on a photosensitive record medium as claimed in claim 4, further comprising:

means for photoelectrically detecting perforations of said record medium to produce a control signal;

means for supplying an electrical signal to an electric motor for driving a pinch roller;

means for supplying said control signal to said supply means to control a frequency of said electrical signal supplied to said motor so that a variation of the running speed of the record medium caused by a slip of said pinch roller and the record medium is compensated.

6. A device for reproducing a color television signal recorded on a photosensitive record medium, comprising:

means for continuously driving said record medium at a speed corresponding to a vertical scanning period of the color television signal recorded thereon, said record medium having recorded thereon successive field information of the color video signal in successive frames and carrier information in successive intervals between successive frames and at both sides of the frames, each of said intervals corresponding to a vertical blanking period of the color video signal and said both sides of the frames corresponding to front and back porches of a horizontal blanking period;

a cathode ray tube for producing a uni-dimensional scanning light of a constant brightness, a scanning frequency of said uni-dimensional scanning light being a function of the horizontal scanning frequency of the color video signal;

means for fixedly holding a record pattern which is substantially identical with the carrier pattern recorded in said intervals of said record medium;

means for dividing said uni-dimensional scanning light into three identical uni-dimensional scanning lights and for directing first two of said three uni-dimensional scanning lights to two successive frames of the record medium and the last one of said three-dimensional scanning lights to said record pattern;

means for receiving said first two uni-dimensional scanning lights transmitted through said successive frames of said record medium to reproduce the color video signals;

means for receiving said last uni-dimensional scanning light transmitted through said record pattern to produce a carrier;

means for deriving carrier chrominance signals and luminance signals from said reproduced color video signals;

means for forming a difference signal of said carrier chrominance signals;

means for forming a sum signal of said carrier chrominance signals; and means for synchronously detecting said difference and sum signals with the aid of a reference carrier having a phase correlated with said carrier produced by said record pattern.

7. A device for reproducing a color television signal recorded on a photosensitive record medium, comprising:

means for continuously driving said record medium at a speed corresponding to a vertical scanning period of a color video signal recorded thereon, said record medium having recorded thereon successive field information of the color video signal in successive frames and carrier information in successive intervals between successive frames, each of said intervals corresponding to a vertical blanking period of the color video signal;

a cathode ray tube for producing a uni-dimensional scanning light of a constant brightness, a scanning frequency of said uni-dimensional scanning light being a function of the horizontal scanning frequency of the color video signal;

beam splitting means for dividing said uni-dimensional scanning light into two identical uni-dimensional scanning lights;

optical means for converting one of said two uni-dimensional scanning lights into a two-dimensional scanning light by periodically deflecting said uni-dimensional scanning light along a running direction of said record medium during a period corresponding to a vertical scanning period of the color video signal;

means for directing said two-dimensional scanning light to said record medium;

means for directing the other of said two uni-dimensional scanning lights to said record medium;

means for receiving said two-dimensional scanning light transmitted through said record medium to reproduce the color video signal recorded in the frame of said record medium;

means for receiving said uni-dimensional scanning light transmitted through said record medium to reproduce a carrier recorded in said intervals of said record medium;

means for deriving carrier chrominance signals and luminance signals from said reproduced color video signals; and means for demodulating color difference signals from said carrier chrominance signal with the aid of a reference carrier having a phase correlated with said reproduced carrier.

8. A device for reproducing a color television signal recorded on a photosensitive record medium as claimed in claim 7, wherein said optical means comprises a rotating polygonal prism which rotates such that a peripheral speed of said polygonal prism corresponds to the running speed of said record medium.

9. A device for reproducing a color television signal recorded on a photosensitive record medium as claimed in claim 7, wherein said optical means comprises a sprocket wheel rotating at a speed corresponding to a vertical scanning period of the color video signal and a plane mirror for reflecting said one of said two uni-dimensional scanning lights, said plane mirror being swung by said rotating sprocket wheel in such a manner that the direction of reflection is varied in a sawtooth waveform manner with a period corresponding to said vertical scanning period.

10. A device for reproducing a color television signal recorded on a photosensitive record medium, comprising:

means for continuously driving said record medium at a speed corresponding to a vertical scanning period of a color video signal recorded thereon, said record medium having recorded thereon successive field information in successive intervals between successive frames, each of said intervals corresponding to a vertical blanking period of the color video signal;

a cathode ray tube for producing a uni-dimensional scanning light including two different color components;

a dichroic mirror for dividing said uni-dimensional scanning light into first and second uni-dimensional scanning lights of said two different color components;

means for converting said second uni-dimensional scanning light into a wide width uni-dimensional scanning light;

a rotating cylinder of transparent material having color filters of the same surface shape as that of the frame of said record medium, said color filters being able to transmit said first uni-dimensional scanning light and arranged on a part of a periphery of said cylinder with an interval corresponding to said interval between two successive frames of said record medium;

means for continuously driving said record medium at a speed corresponding to a vertical scanning period of the color video signal along a part of the periphery of said cylinder;

means for continuously rotating said cylinder at such a speed that a peripheral speed of said cylinder corresponds to the running speed of said record medium;

means for directing said first uni-dimensional scanning light through said color filters and said transparent cylinder to said record medium;

means for directing said second wide width uni-dimensional scanning light through said intervals between said color filters and said transparent cylinder to said intervals between successive frames of said record medium;

means for receiving said first uni-dimensional scanning light transmitted through said record medium to reproduce the color video signal recorded in the frames of said record medium;

means for receiving said second wide width uni-dimensional scanning light transmitted through said intervals between the frames of said record medium to reproduce a carrier;

means for deriving a carrier chrominance signal and a luminance signal from said reproduced color video signal; and means for demodulating color difference signals from said carrier chrominance signal with the aid of a reference carrier having a phase correlated with said reproduced carrier.

11. A device for reproducing a color television signal recorded on a photosensitive record medium, comprising:

means for continuously driving said record medium at a speed corresponding to a vertical scanning period of a color video signal recorded thereon, said record medium having recorded thereon successive field information of the color video signal in successive frames and carrier information in successive intervals between successive frames, each of said intervals corresponding to a vertical blanking period of the color video signal;

a cathode ray tube for producing a uni-dimensional scanning light of a constant brightness, a scanning frequency of said uni-dimensional scanning light being a function of the horizontal scanning frequency of the color video signal;

means for directing said uni-dimensional scanning light to said running record medium in a direction normal to the traveling direction of said record medium;

means for receiving said uni-dimensional scanning light transmitted through said record medium to reproduce the color video signal recorded in said frames of said record medium and a carrier recorded in said intervals between successive frames;

means for separating a carrier chrominance signal and a luminance signal from said reproduced color video signal;

means for generating a reference carrier by synchronously detecting said reproduced carrier; and means for demodulating color difference signals from said carrier chrominance signal with the aid of said reference carrier.

12. A device for reproducing a color television signal recorded on a photosensitive record medium as claimed in claim 11, wherein said means for generating a reference carrier comprises:

an independent carrier oscillator;

two sets of synchronous detectors for synchronously detecting said reproduced carrier during the vertical blanking period using two carriers having 90° phase difference supplied from said carrier oscillator to decompose said reproduced carrier into two quadrature vector components representing phase information of said reproduced carrier;

two sets of memory devices for storing successively each output signal from said two synchronous detectors in each memory element and for reading out successively each memory element at a repetition rate of the horizontal scanning period during the vertical scanning period under a control of a shift register which is shifted by a fractional frequency of the carrier supplied from said carrier oscillator;

two sets of balanced modulators for modulating said two carriers having 90° phase difference with signals read out from said memory devices; and a combination circuit for combining in vector mode output signals from said two balanced modulators to produce said reference carrier having a phase corresponding to the phase variation of said reproduced carrier.

* * * * *